US012798146B2

(12) United States Patent
Suhling

(10) Patent No.: US 12,798,146 B2
(45) Date of Patent: Nov. 17, 2026

(54) MOUNTING POSITION ASSEMBLY APPARATUS FOR CUTTING TOOLS

(71) Applicant: Robert James Suhling, Waukegan, IL (US)

(72) Inventor: Robert James Suhling, Waukegan, IL (US)

( * ) Notice: Subject to any disclaimer, the term of this patent is extended or adjusted under 35 U.S.C. 154(b) by 156 days.

(21) Appl. No.: 18/731,757

(22) Filed: Jun. 3, 2024

(65) Prior Publication Data

US 2024/0359357 A1 Oct. 31, 2024

(51) Int. Cl.
*B27B 27/02* (2006.01)
*B23Q 1/44* (2006.01)
*B27B 27/10* (2006.01)

(52) U.S. Cl.
CPC ................ *B27B 27/02* (2013.01); *B23Q 1/44* (2013.01); *B27B 27/10* (2013.01)

(58) Field of Classification Search
CPC ..... B27B 27/00; B27B 27/04–10; B23Q 1/25; B23Q 1/26–262; B23Q 1/44
See application file for complete search history.

(56) References Cited

U.S. PATENT DOCUMENTS 1,504,248 A 8/1924 Charles
1,823,268 A 9/1931 James
2,435,382 A 2/1948 Caskey
4,693,158 A 9/1987 David
4,817,693 A 4/1989 Schuler
4,871,156 A 10/1989 Kozyrski
4,887,653 A 12/1989 Thomas
4,948,313 A * 8/1990 Zankovich ............ F16B 37/045 411/85
5,018,562 A 5/1991 Adams
5,038,486 A 8/1991 Ducate, Sr.
5,063,983 A 11/1991 Barry
5,209,619 A * 5/1993 Rinderer ............... F16B 37/045 411/85
5,267,818 A 12/1993 Marantette
5,359,824 A 11/1994 Koberstein
5,647,707 A * 7/1997 Poulin ....................... B27C 9/04 409/164
5,664,612 A 9/1997 Klemma
5,716,045 A 2/1998 Taylor
5,765,448 A 6/1998 Martelli
5,768,966 A 6/1998 Duginske
5,845,555 A 12/1998 Dawley
5,890,524 A 4/1999 Tucker et al.

(Continued)

*Primary Examiner* — Ghassem Alie
*Assistant Examiner* — Richard D Crosby, Jr.
(74) *Attorney, Agent, or Firm* — Lesavich High-Tech Law Group, S.C.; Stephen Lesavich

(57) ABSTRACT

The apparatus includes two mounting rails connected by plural rollers or a single mounting rail that are insertable into and removable from a rail system for a cutting saw. The apparatus includes locking components to lock the mounting rails securely into the rail system at plural different locations. The apparatus includes material holding components dynamically attachable to and removable from to the mounting rails. The material holding components movable up and down vertically on a vertical threaded component for engaging and holding materials of varying thickness at plural different vertical positions on plural different surfaces for safely cutting with the cutting saw on the rail system.

21 Claims, 14 Drawing Sheets

(56) References Cited

U.S. PATENT DOCUMENTS 5,903,125 A 5/1999 Prentice et al.
5,919,014 A 7/1999 Weck et al.
6,328,510 B1 12/2001 Hanrath et al.
6,557,601 B1 5/2003 Taylor
6,851,243 B1 2/2005 Sandford
6,851,345 B1 2/2005 Kennelly
7,036,540 B2 5/2006 Welsh et al.
7,100,515 B2 * 9/2006 Helm .................... H05K 13/04 108/143
7,234,566 B2 * 6/2007 Simmons .............. E04B 1/4107 52/301
7,261,502 B2 8/2007 Pasquetto
7,287,733 B2 * 10/2007 Bongio ................... E04B 9/127 52/506.08
7,389,621 B2 * 6/2008 Hawes .................. E04G 21/242 52/843
7,478,787 B2 * 1/2009 Bankston .................. E04B 9/18 52/506.07
7,587,838 B2 9/2009 Mastrobattista
8,033,535 B2 10/2011 Mannon
8,220,374 B2 * 7/2012 Wang ...................... B27B 27/10 83/435.15
8,272,334 B2 9/2012 Wang et al.
8,342,055 B2 1/2013 Wang et al.
8,366,340 B2 * 2/2013 Munakata ............. F16B 37/045 403/231
8,454,259 B2 * 6/2013 Oetlinger .............. E05D 5/0238 403/231
8,463,765 B2 6/2013 Lesavich
8,480,067 B2 7/2013 Furlow
8,567,030 B2 * 10/2013 Koch ...................... F24S 25/30 52/717.03
8,615,947 B2 * 12/2013 Underkofler .............. E04B 9/18 248/323
8,621,969 B2 1/2014 Dawley, III
8,661,956 B2 3/2014 Thomas
9,004,421 B2 * 4/2015 Feenstra ................... E04B 9/18 248/200.1
9,037,564 B2 5/2015 Lesavich et al.
9,056,402 B2 6/2015 Clark
9,097,004 B2 * 8/2015 Yau ........................... E04B 5/40
9,137,250 B2 9/2015 Lesavich et al.
9,347,213 B1 * 5/2016 Zhang ..................... E04B 1/388
9,361,479 B2 6/2016 Lesavich et al.
9,545,734 B2 1/2017 Suhling
9,569,771 B2 2/2017 Lesavich et al.
9,574,589 B2 * 2/2017 Knutson .............. F16M 13/027
9,616,587 B2 4/2017 Xu
9,682,454 B2 6/2017 Suhling
9,683,590 B2 * 6/2017 Zhang ................... F16B 7/0473
10,022,887 B2 7/2018 Hogenhout
10,245,653 B2 4/2019 Suhling
10,336,127 B1 7/2019 Suhling
10,661,457 B2 5/2020 France
10,766,109 B2 * 9/2020 Suhling .................... B25H 1/14
10,836,066 B2 11/2020 Suhling
10,858,058 B2 12/2020 Suhling
11,118,345 B2 * 9/2021 Gstach ...................... E04C 5/01
11,180,171 B1 11/2021 Suhling
11,383,336 B2 7/2022 Suhling
11,479,964 B2 * 10/2022 Schluter .................... E04B 1/58
D1,003,680 S 11/2023 Sherman
12,109,723 B2 * 10/2024 Sherman ................. B27B 27/02
2002/0078657 A1 * 6/2002 Zambelli ............... F16B 37/045 52/707
2005/0056345 A1 * 3/2005 Duginske ................ B27B 27/02 144/144.1
2008/0053283 A1 3/2008 Lin
2009/0095141 A1 4/2009 Billings
2011/0208710 A1 8/2011 Lesavich
2012/0278622 A1 11/2012 Lesavich et al.
2014/0026725 A1 1/2014 Makropoulos
2014/0189792 A1 7/2014 Lesavich et al.
2015/0298273 A1 10/2015 Suhling
2015/0306784 A1 10/2015 Suhling
2015/0379301 A1 12/2015 Lesavich et al.
2016/0321654 A1 11/2016 Lesavich et al.
2018/0030717 A1 2/2018 Yang
2018/0043439 A1 2/2018 Suhling
2018/0187411 A1 7/2018 Shang
2019/0381614 A1 * 12/2019 Suhling .................. B23Q 3/007
2019/0389500 A1 12/2019 Suhling
2020/0001495 A1 1/2020 Suhling
2020/0215713 A1 7/2020 Friedebach
2021/0394319 A1 12/2021 Suhling
2023/0234257 A1 * 7/2023 Sherman ................. B27B 25/10 83/451

* cited by examiner

EXPLODED VIEW

MOUNTING POSITION ASSEMBLY APPARATUS FOR CUTTING TOOLS

CROSS REFERENCES TO OTHER APPLICATIONS

Not Applicable.

FIELD OF INVENTION

This application relates to clamping of materials during cutting. More specifically, it relates to a mounting position assembly apparatus for cutting tools.

BACKGROUND OF THE INVENTION

When a saw such as a table top saw, a chop saw, miter saw, etc. is used to cut a material, such as wood, metal, plastic, cutting protection guides are used to prevent injuries to a person cutting the materials.

A rail system (also called a track system or a strut system) for a cutting saw ensures that a cutting saw is square to an edge of a material being cut helping to increase the accuracy of cuts.

Most rail systems have two parallel guide rails connected with perpendicular support pieces providing a supported straight track to the cutting saw to move a piece of material being cut. Many rail systems include the two parallel guide rails with lengths of three to four feet (about 91.44 meters to about 1.22 meter) in length before the cutting saw and after the cutting saw to provide support for the materials before and after a cut.

Cutting protection guides keep material pieces square to a cutting blade on a saw for accuracy, and allows the use of stops for repeat cuts and align the material to keep it straight while being cut. Cutting protection guides provide measure of safety for a user of a cutting saw.

There are several problems associated with cutting protection guides used for cutting saws on rail systems. One problem is that many cutting protection guides are handheld by a user of a cutting saw and require a user of the cutting saw to push a material being cut past the cutting blade.

Another problem is this most cutting protection guides are not useable on a rail system used for cutting saws to hold a long piece (e.g. ten feet or about 3.05 meter) or a very short piece of material being cutting.

Another problem is that most cutting protection guides are static and not dynamically movable on the rail system stand used for the cutting saw.

Another problem is that most cutting protection guides are not dynamically adjustable in both a vertical and a horizontal position on the rail system used for cutting saws.

Another problem is that most cutting protection guides are not designed to hold a piece of material at various angles so a material (e.g., a crown molding material) that needs to be cut a very specific angle (e.g., for a corner of a room, etc.) can be cut safely.

Another problem is that most cutting protective guides do not have any rollers to allow easy advancement of a piece of material being cut.

Another problem is that most cutting protect guides do not provide multiple different surfaces at multiple different angles to hold a piece of material being cut.

Another problem is that the rails of the rail system are manufactured from aluminum and may warp or otherwise be deformed (e.g., with use in hot and/or cold temperatures) during repeated use. Such warping and deformation prevent cutting protection guides from being securely clamped with the rail system.

There have been several attempts to solve some of the problems associated cutting protection guides.

For example, U.S. Pat. No. 11,383,336, that issued to Suhling teaches "A reversible flip-away work-stop for strut systems. The reversible flip-way work stop includes a first component allowing a work stop positioning plate to pivot in a semi-circular motion allowing the work stop positioning plate to be moved and immediately configured in a right-handed configuration or a left-handed configuration without manual disassembly and reassembly in a strut in a strut system. A second component allowing the work stop positioning plate to be micro-adjusted to measurements including thousands of an inch for precisely measuring a material to be cut. A third component includes a pre-determined length to exactly match an alignment of a front face of the work stop positioning plate allowing a measurement to be read on a measuring component in the strut on the strut system without obstruction. The third component also including a pre-determined width and shape matching a width and a shape of a measuring component in the strut on the strut system allowing easy movement of the reversible flip-away work stop within the strut in the strut system and providing the ability to add a custom measuring component to the strut system."

U.S. Pat. No. 10,766,109, that issued to Suhling teaches "The invention allows for alignment perpendicular to a track engaged by a securing nut. An opposing tooth key type aligner has two functions: keeps the second track perpendicular to the first track and allows the securing nut to always be correctly oriented to engage with the track. A bolt clamps the securing nut to the track to lock the position of the invention. A second axis perpendicular to the lower track is created with a second track. A bolt connected to a coupler nut engages with the middle track to create a third axis perpendicular to both previous axes. A washer provides a neutral bearing surface between the coupler nut and second track. An elevation bolt sets the vertical position of the object to be mounted. A bolt can be used to fasten an object to the end of the elevation bolt."

U.S. Pat. No. 10,836,066, that issued to Suhling teaches "A Zero Clearance Fence that gives precision to chop saw fences. The invention consists of two flat surfaces and mounting devices. The flat surfaces are beveled at one edge of both surfaces. The beveled edge allows a tape measure to be hooked on at any desired miter angle. The invention mounts onto the original chop saw fences so that they are able to slide towards and away from the saw blade. The ability to slide allows the fences to always be right next to the saw blade at any miter angle cut for precision in the cut measurements. The mounting apertures can be located anywhere to allow the Zero Clearance Fence to fit on any chop saw."

U.S. Pat. No. 9,682,454, that issued to Suhling teaches "An in-line indexing mechanism as part of a work-stop system which employs a lead screw to alter the relative distance between a work-stop plate and a swing arm—as well as alignment pins and springs to maintain contact and rigidity between this work-stop plate and swing arm—in order to precisely alter the parameters of a workpiece plane. In particular, the indexing mechanism of the preferred embodiment resides within the extension of an arm, and is located, by default, within the workpiece plane: the act of indexing therefore exerts force upon a workpiece along a coincident axis within said workpiece plane. Additionally, the indexing mechanism may be removed from the workpiece plane, by way of axially rotating the arm, without abandoning the original workpiece parameter and adjustment values."

U.S. Pat. No. 9,545,734, that issued to Suhling teaches "A clamp that is meant to act as a coordinate locator for any number of power tools, but most specifically for use with the Biesemeyer T-style table saw fences. The assembly is comprised of a C-frame which offers the ability to enact a clamping action and the ability to enact an indexing action. The design of the assembly allows not only for the clamping of an imprecise reference point along a table saw fence, but also the fine adjustment of indexing a screw against the table saw fence."

However, these solutions still do not solve all of the problems associated with cutting protection guides used for cutting saws. Thus, it is desirable to solve some of the problems associated with cutting protection guides used for cutting saws.

SUMMARY OF THE INVENTION

In accordance with preferred embodiments of the present invention, some of the problems associated with clamping materials during cutting are overcome. A mounting position assembly apparatus for cutting tools is presented.

The apparatus includes two mounting rails connected by plural rollers that are insertable into and removable from a rail/track/strut system for a cutting saw. The apparatus includes two locking components to lock the two mounting rails securely into the rail system for the cutting saw at plural different locations. The apparatus includes one or more material holding components dynamically attachable to and removable from to the first mounting rail and the second mounting rail. The one or more material holding components movable up and down vertically on a vertical threaded component for engaging and holding materials of varying thickness at plural different vertical positions on plural different surfaces for cutting with the cutting saw.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Exemplary Mounting Position Assembly Apparatus

Figure 1:
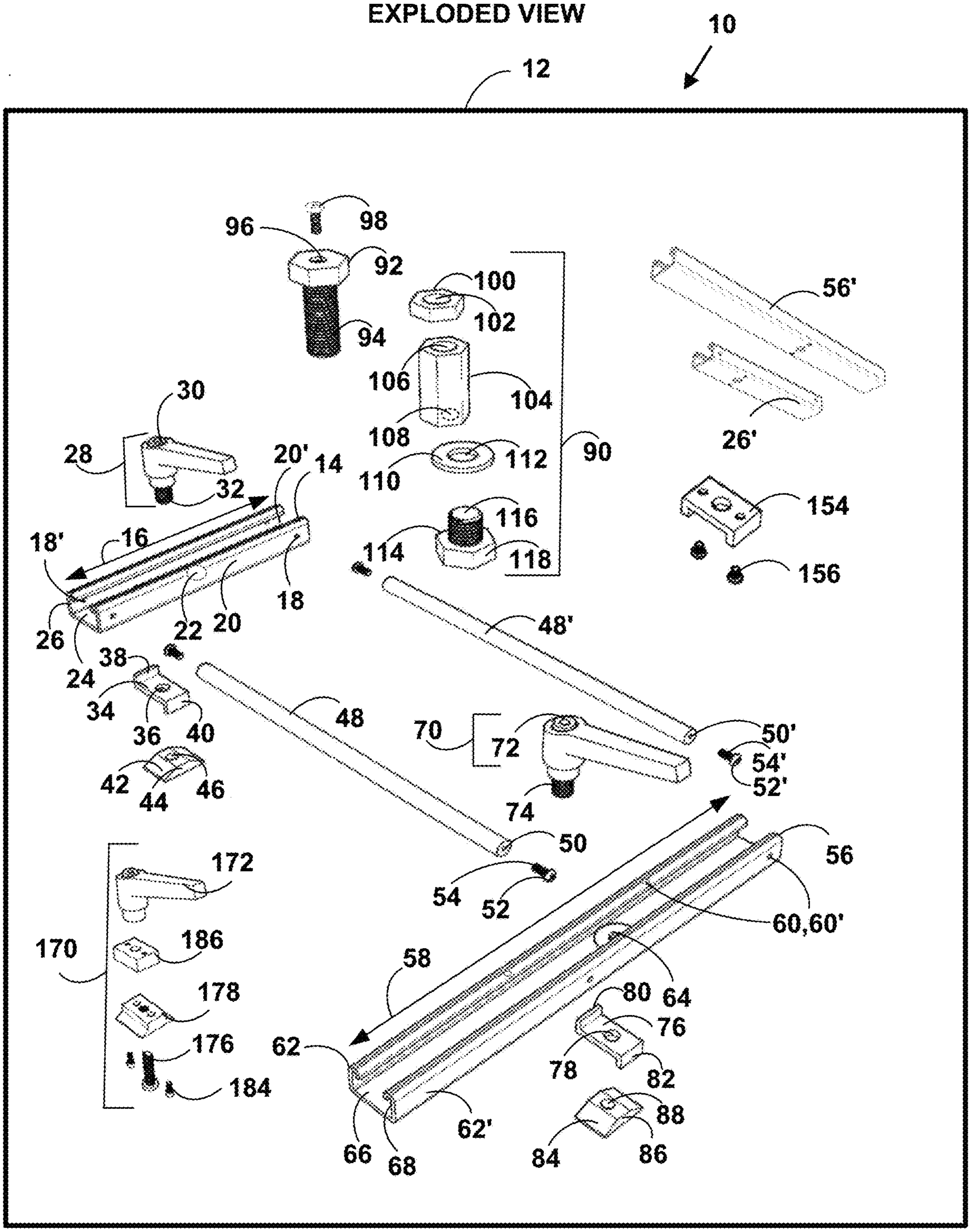
FIG. 1 is a block diagram illustrating an exploded view of a mounting position assembly apparatus.

FIG. 1 is a block diagram 10 illustrating an exploded view of a mounting position assembly apparatus 12.

The mounting position assembly apparatus 12 includes, but is not limited to, a first mounting rail 14 with a first pre-determined length 16, including: plural first side connection receptacles 18, 18' for accepting plural first side connection components (e.g. rollers 48, etc.) in one or more first side surfaces 20, 20' of the first mounting rail 14, one or more first threaded bottom connection receptacles 22 for accepting one or more first bottom connection components in a first bottom surface 24 of the first mounting rail 14 to connect the first mounting rail 14 to a first fence rail (track/strut) 128 (FIG. 4) in a rail (track/struct) system 126 for a cutting saw 130 (FIG. 4), the first mounting rail 14 including a channel with a first pre-determined shape 26.

In one embodiment, the first pre-determined shape for channel 26 includes, but is not limited to a T-shaped channel and/or a dove-tail shaped channel 26. In embodiment, the first channel shape 26 is identical to a second channel shape 68. In another embodiment the first channel shape 26 is different than the second channel shape 68. However, the present invention is not limited to such embodiments and other embodiments with other shapes may be used to practice the invention.

Figure 4:
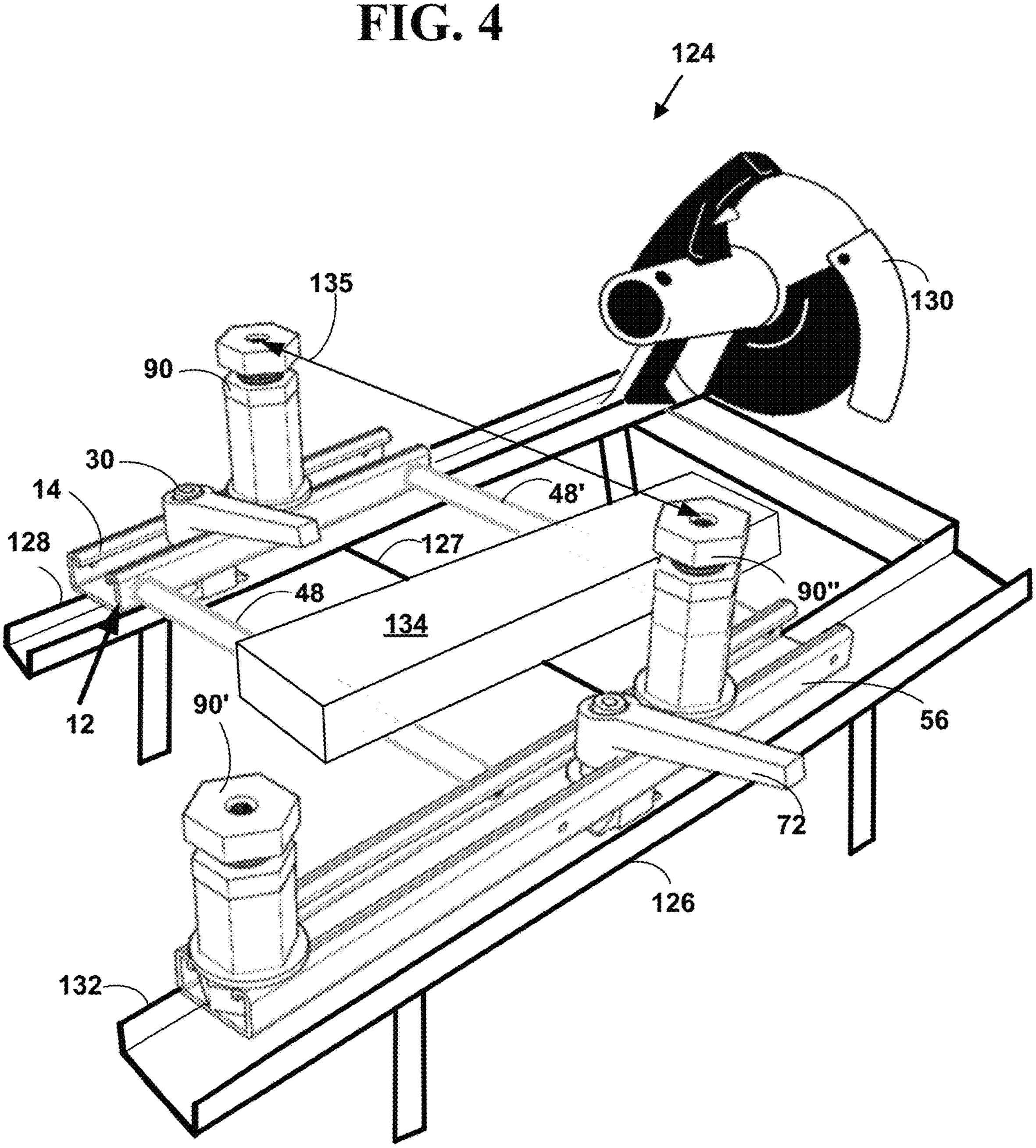
FIG. 4 is a block diagram illustrating a top perspective view of a mounting position assembly apparatus on a rail system for a cutting saw including a flat piece of material to be cut.
Figure 5:
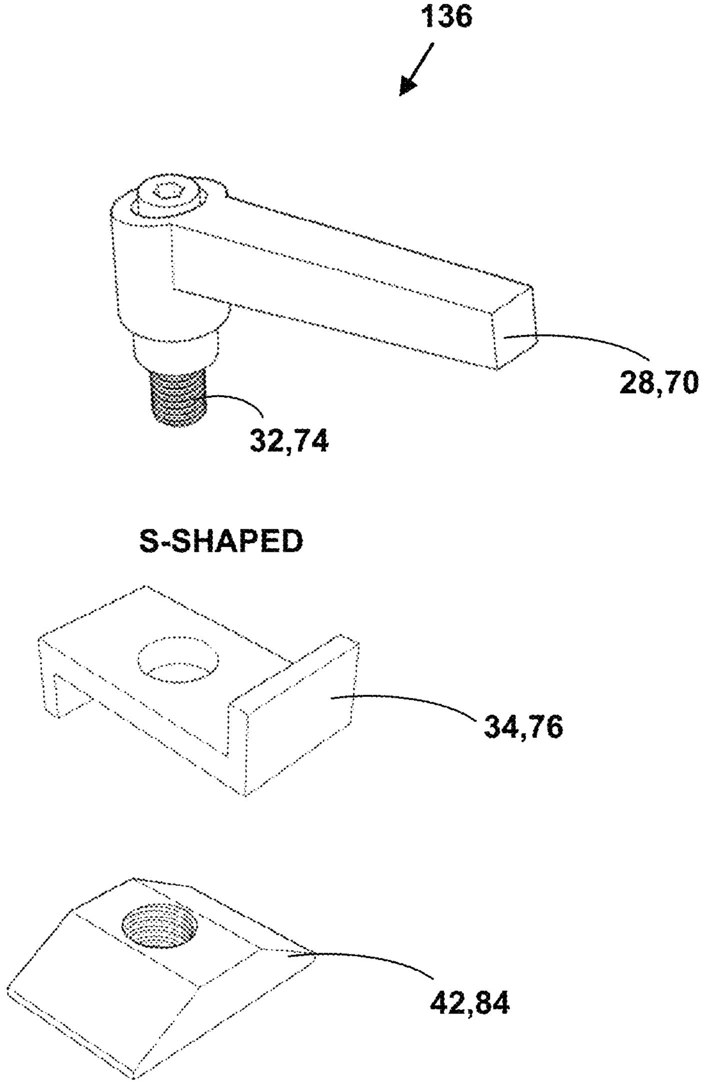
FIG. 5 is a block diagram illustrating a top perspective view of a dove-tail shaped component.

A dove-tail shape is a polygonal shape with triangular sides and a flat top (e.g., FIG. 5). A dove-tail shape is illustrated with a first handle connection component 42 and a second handle connection component 84 in FIG. 1. It has been determined experimentally that a dove-trail shape of the handle connection components 42, 84 allows such a component to be tightened with a greater tightening force to prevent slipping in the rails 128, 132 of the rail system 126 (FIG. 4) for the cutting saw 130 than a T-shaped component including when used in a T-shaped channel.

In one embodiment, handle connection components 42, 84 include a steel and/or stainless-steel component. This all the mounting position assembly apparatus 12 to be secured tightened in rails 128, 132 of the rail system 126, even after the rails 128, 132 of the rail system 126 may warp or otherwise be deformed, expand and/or contract (e.g., with use in hot and/or cold temperatures) and/or encounter destructive wear during repeated use. However, the present invention is not limited to this embodiment and other embodiments may be used to practice the invention.

The mounting position assembly apparatus 12 includes, but not limited to, a first fence rail locking component 28 including, but not limited to, a first male handle component 30 with a threaded male component 32 for engaging a first bottom connection receptacle 22 in the bottom surface 24 in the first mounting rail 14, a first handle support component 34 including a central receptacle 36 extending through the first handle support component 34 for engaging the threaded male component 32 of the first handle support component 34 including: a first support component 38 extending upwards from a first end surface of the first handle support component 34 to engage and provide support on a side surface 20 of the first mounting rail 14, and a second support component 40 extending downward from a second end surface of the first handle support component 34 to engage and provide support for a first handle connection component 42 on a side surface 44 of the first handle connection component 42, the first handle connection component 42 including: a threaded female central receptacle 46 for accepting the threaded male component 32 of the first male handle component 30 for securely tightening and holding the first fence rail locking component 34 and first mounting rail 14 at a first desired position in the first fence rail 128 (FIG. 4) in the rail system 126 for the cutting saw 130. The first male handle component 30 rotatable in a clockwise and counterclockwise direction for tightening and loosening the first fence rail locking component 28 allowing movement of the first fence rail locking component 28 to plural different positions in the first fence rail 128 in the rail system 126 for the cutting saw 130.

The mounting position assembly apparatus 12 includes, but not limited to, plural rollers 48, 48' (only two of which are illustrated for simplicity) including: threaded female receptacles 50, 50' in both ends of the plural rollers 48, 48' for attaching the plural rollers 48, 48' to the first mounting rail 14 at one end and to a second mounting rail 54 with a second pre-determined length 58 at a second end. Plural roller connection components 52, 52' including threaded male components 54, 54' for engaging the threaded female receptacles 52, 52' in ends of the plural rollers 48, 48' through the one or more first side connection components 18, 18' in the one or more first side surfaces 20, 20' of the first mounting rail 14, and through one or more second side connection components in one or more second side surfaces 60, 60' of the second mounting rail 56. The plural rollers 48, 48' allowing materials 134 (FIG. 4) to be cut with the cutting saw 130 to be easily rolled along the rail system 126 for the cutting saw 130 within the mounting position assembly apparatus 12.

In one embodiment, the plural rollers 48, 48' provide a first safety improvement with the apparatus 12 as the materials 134 to be cut with the cutting saw 130 move smoothly would binding on any components of the rail system 126.

In one embodiment, the materials 134 to be cut include, wood, metal, plastic, and/or other types of materials.

In one embodiment, the plural rollers 48, 48' are replaced with circular tubing and are structural connection components. In such an embodiment, the circular tubing provide less binding for the materials 134 to be cut by the cutting saw 130. However, the present invention is not limited to such an embodiment and other embodiments with and/or without rollers can be used to practice the invention.

The mounting position assembly apparatus 12 includes, but is not limited to, aa second mounting rail 56 with a second pre-determined length 58, including: plural second side connection receptacles 60, 60' for accepting plural second side connection components (e.g., rollers 48, 48' etc.) in one or more second side surfaces 62, 62' of the second mounting rail 56, one or more second threaded bottom connection receptacles 64 for accepting one or more second bottom connection components in a second bottom surface 66 of the second mounting rail 56 to connect the second mounting rail 56 to a second fence rail 132 (FIG. 4) in the rail system 126 for the cutting saw 130, the second mounting rail 56 including a channel with a second pre-determined shape 68.

In one embodiment, the second pre-determined shape for channel 56 includes, but is not limited to a T-shaped channel and/or a dove-tail shaped channel 68. In embodiment the first channel shape 26 is identical to a second channel shape 68. In another embodiment the first channel shape 26 is different than the second channel shape 68. However, the present invention is not limited to such embodiments and other embodiments with other shapes may be used to practice the invention.

The mounting position assembly apparatus 12 includes, but not limited to, a second fence rail locking component 70 including, but not limited to, a second male handle component 72 with a second threaded male component 74 for engaging a second threaded bottom connection receptacle 64 in the second bottom surface 66 in the second mounting rail component 56, the second handle support component 76 including a central receptacle 78 extending through the second handle support component 76 for engaging the second threaded male component 74 of the second male handle component 72, the second handle support component 76 including: a first support component 80 extending upwards from a first end surface of the second handle support component 76 to engage and provide support on a side surface 62, 62' of the second mounting rail 56, and a second support component 82 extending downward from a second end surface of the second handle support component 76 to engage and provide support for a second handle connection component 84 on a second side surface 86 of the second handle connection component 84, the second handle connection component 84 including: a threaded female central receptacle 88 for accepting the threaded male component 74 of the second male handle component 72 and securely tightening and holding the second fence rail locking component 70 and second mounting rail 56 at a second desired position in the second fence rail 132 in the rail system 126 for the cutting saw 130. The second male handle component 70 rotatable in a clockwise and counterclockwise direction for tightening and loosening the second fence rail locking component 70 allowing movement of the second fence rail locking component 70 to plural different positions in the second fence rail 132 in the rail system 126 for the cutting saw 130.

The mounting position assembly apparatus 12 includes, but not limited to, one or more material holding components, an individual material holding component 90 including: a first material holding component 92 with a first threaded male component 94 for engaging a second material holding component 100 with a second threaded female receptacle 102 and a first threaded female receptacle 96 in a top surface of the first material holding component 92 for engaging extensions 98 to the first material holding component 92.

Figure 6:
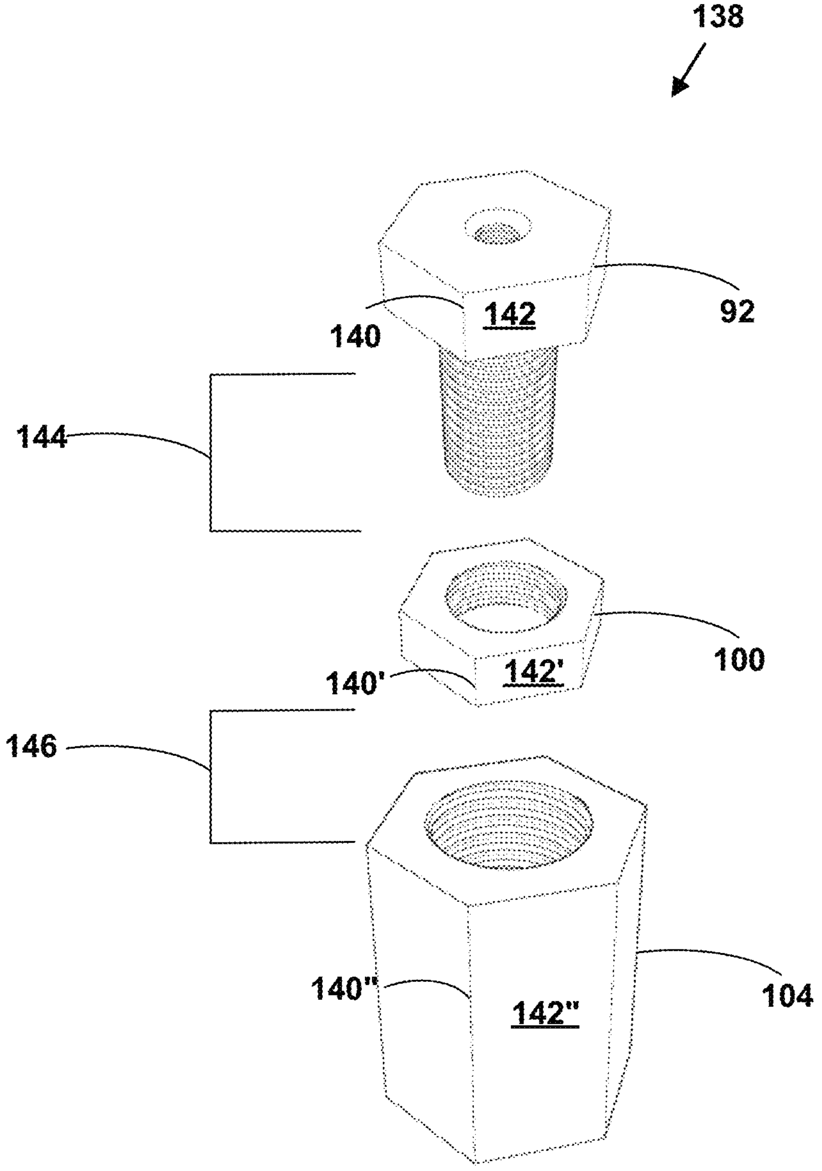
FIG. 6 is a block diagram illustrating a top perspective view of a hexagon shaped component.

The mounting position assembly apparatus 12 includes, but not limited to, the second material holding component 100 movable up and down vertically on the first threaded male component 94 of the first material holding component 92 for engaging and holding materials 134 of varying thickness at plural different vertical positions on the first threaded male component 92 and/or for engaging and holding materials of varying thickness in between the first material holding component 92 and the second material holding component 100 (e.g., 144 FIG. 6) and/or in between the second material holding component 100 and a third material holding component 104 (e.g., 146, FIG. 6).

The mounting position assembly apparatus 12 includes, but not limited to, a third material holding component 104 with a top third threaded female receptacle 106 in a top surface of the third material holding component 104 for engaging the first threaded male component 94 of the first material holding component 92 for engaging and holding materials of varying thickness and a bottom third threaded female receptacle 108 in a bottom surface of the third material holding component 104 for engaging a second threaded male component 116 from a fourth material holding component 114. The third material holding component 104 movable up and down on the first threaded male component 94 of the first material holding component 92 for engaging and holding materials of varying thickness at plural different vertical positions on the first threaded male component 92.

The mounting position assembly apparatus 12 includes, but not limited to, a material holding support component 110 with a central receptacle 112 extending through the material holding support component 110 for engaging the second threaded male component 116 from the fourth material holding component 114. The material holding support component 110 including a diameter wider than a first width of the first mounting rail 14 and wider than a second width the second mounting rail 56 providing support for the individual material holding component 110 on a first top surface on the first mounting rail 14 and a second top surface on the second mounting rail 56.

The mounting position assembly apparatus 12 includes, but not limited to, a fourth material holding component 114, including the second threaded male component 116 for engaging the bottom third threaded female receptacle 108 in the bottom surface of the third material holding component 104, the second threaded male component 116 extending upward from a bottom portion 118 of the fourth material component 114. The fourth material component 114 including the bottom portion 118 of the fourth material component 114 for attaching the individual material holding component 90 within the first channel 24 of the first mounting rail 14 including or within the second channel 66 of the second mounting rail 56 at plural different positions within the first mounting rail 14 or within the second mounting rail 56.

FIG. 1 illustrates individual material holding components 90 including hexagon shaped components 92, 100, 104, 114. The hexagon shaped components 92, 100, 104, 114 are dynamically rotatable and adjustable to plural different angles. The hexagon shape was selected to allow the individual material holding component 90 to hold and engage plural different types of materials 134 to be held in place at plural different angles, including but not limited to a hexagon edge 140, 140', 140" (FIG. 6), where two hexagon sides meet, and/or on an individual side of a hexagon 142 (FIG. 6), with the mounting position assembly apparatus 12 for plural different types of materials with plural different surface angles (e.g., square, rectangle, polygonal, circular, oval, etc.) However, the present invention is not limited to such an embodiment and other shapes can be used for the individual material holding components 90.

In one embodiment, individual material holding components 90 including hexagon shaped components 92, 100, 104, 114 are used to engage and hold molding and/or crown molding. Crown molding is a decorative element that is installed where a wall meets a ceiling of a room in a structure. Crown molding is typically sold with 45°/45° and/or 52°/38° angles, with either 45°, 38° or 52° angles (i.e., spring angles, etc.) from a 90° wall. Crown molding is cut at many different angles and small pieces are very difficult to safely hold while cutting. The individual material holding components 90 of the present invention allow crown molding of all sizes and shapes including very long and very small pieces of crown molding and other materials to be safely held and cut with the cutting saw 130. However, the present invention is not limited to such an embodiment and other embodiments can be used to practice the invention.

In one embodiment, individual material holding components 90 are adjusted vertically up and down to allow materials 134 to be cut with different models of cutting saws 130 that have blades at different heights above the rail systems 126, 162. However, the present invention is not limited such an embodiment and other embodiments may be used to practice the invention.

FIG. 1 illustrates the first mounting rail 14 with the first pre-determined length 16 which is shorter than the second mounting rail 56 with pre-determined length 58. In this embodiment, the first mounting rail 14 with the first pre-determined length 16 is shorter than the second mounting rail 56 with pre-determined length 58 to allow the cutting saw 130 blade to rotated left and/or right a full forty-five degrees and not interfere with the apparatus 12. However, the present invention is not limited to such an embodiment and other embodiments can be used to practice the invention.

In another embodiment, the first pre-determined length 16 of the first mounting rail 14 is identical to the second pre-determined length 58 of the second mounting rail 56. In another embodiment, the first pre-determined length 16 of the first mounting rail 14 is longer than the second pre-determined length 58 of the second mounting rail 56. However, the present invention is not limited to such embodiments and other embodiments with other pre-determined lengths can be used to practice the invention.

In one embodiment, the first mounting rail 14 with the first pre-determined length 16 with a length shorter than the second mounting rail 56 with pre-determined length 58 is a lowest cost option of the invention to produce. However, the present invention is not limited to such embodiments and other embodiments with other pre-determined lengths can be used to practice the invention.

In one embodiment, the first mounting rail 14 with the first pre-determined length 16 is about eighteen inches long (about 47.52 centimeters (cm) which is shorter than the second mounting rail 56 with a pre-determined length 58 of thirty-six inches (about 91.44 cm). However, the present invention is not limited to such embodiments and other embodiments with other pre-determined lengths can be used to practice the invention.

However, the present invention is not limited to such embodiments and more, fewer and/or other components can be used for the mounting position assembly apparatus 12 to practice the invention.

Figure 2:
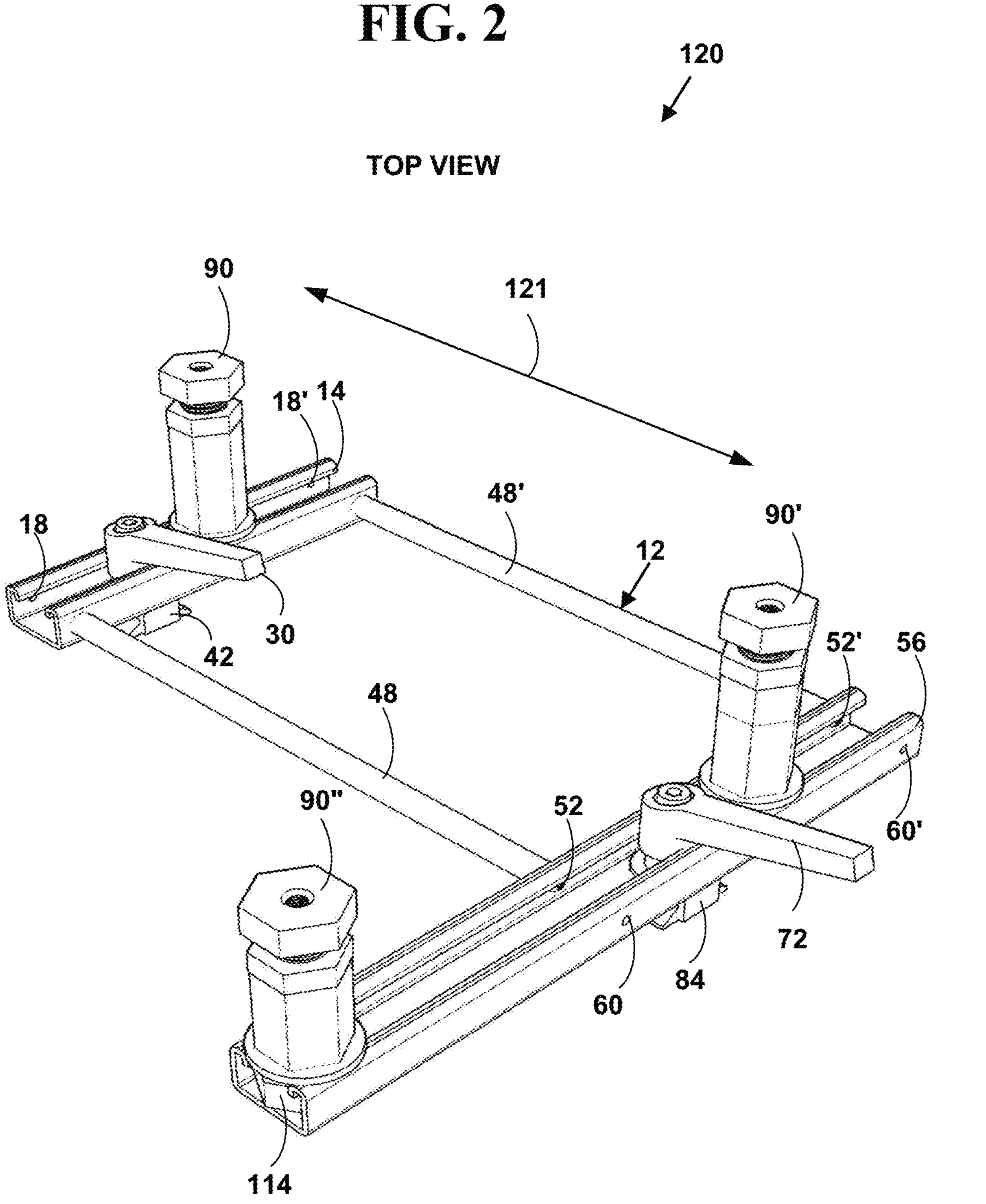
FIG. 2 is a block diagram illustrating a top perspective view of a mounting position assembly apparatus.

FIG. 2 is a block diagram 120 illustrating a top perspective view of a mounting position assembly apparatus 12.

FIG. 2 illustrates three individual material holding components 90, 90' 90". One individual material holding component 90 on the first mounting rail 14 and two individual material holding components 90', 90" on the second mounting rail 56. However, the present invention is not limited to such an embodiment and more, fewer and other configurations of the individual material holding components 90, 90', 90" to practice the invention.

FIG. 2 illustrates a direction 121 of placement of materials (e.g., wood, metal, plastic, etc.) to be cut. In FIG. 2, the material to be cut is placed on top surfaces of two the individual material holding components 90, 90'.

Figure 3:
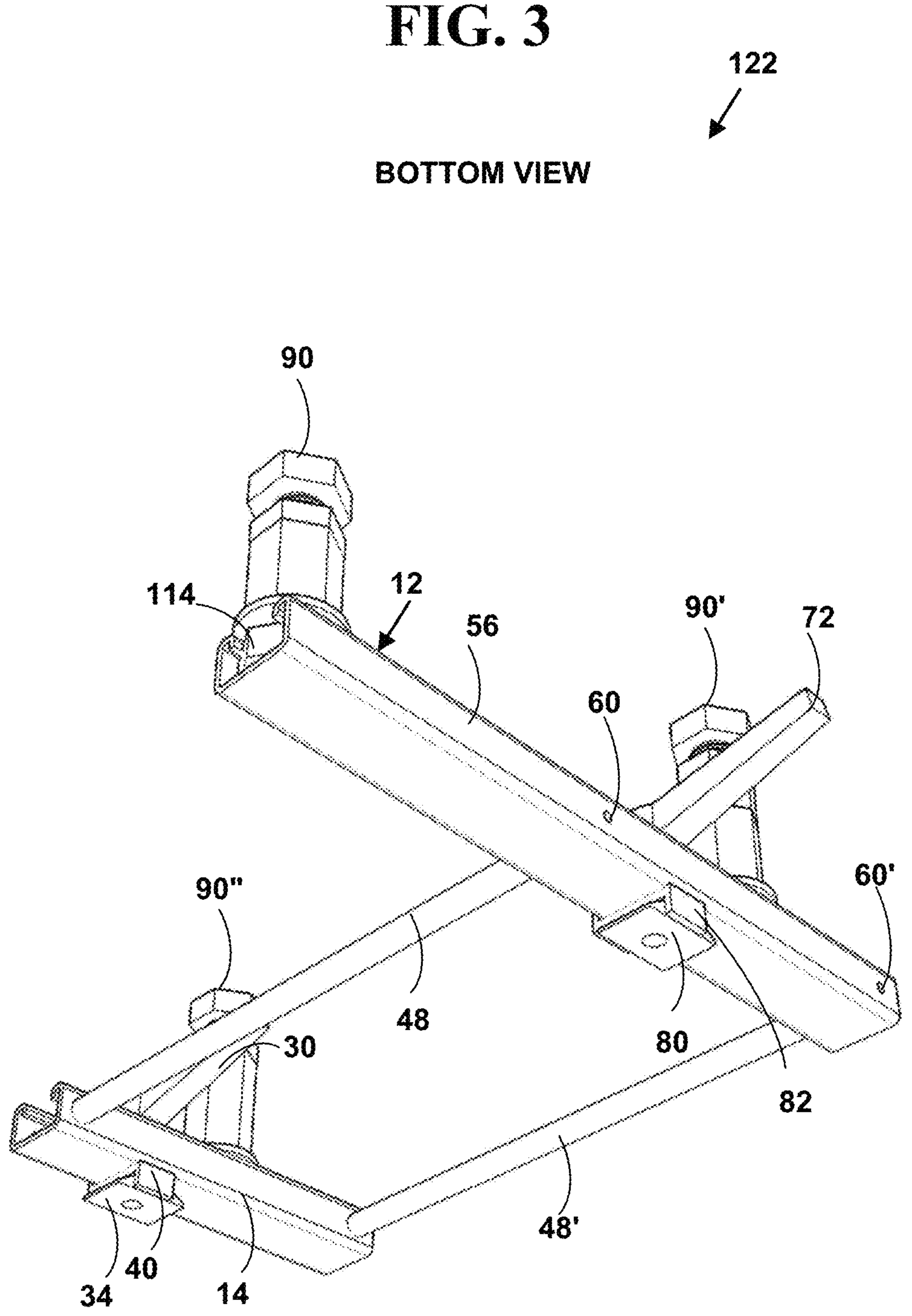
FIG. 3 is a block diagram illustrating a bottom perspective view of a mounting position assembly apparatus.

FIG. 3 is a block diagram 122 illustrating a bottom perspective view of a mounting position assembly apparatus 12.

FIG. 3 illustrates three individual material holding components 90, 90' 90". One individual material holding component 90 on the first mounting rail 14 and two individual material holding components 90', 90". However, the present invention is not limited to such an embodiment and more, fewer and other configurations of the individual material holding components 90, 90', 90" to practice the invention.

FIG. 4 is a block diagram 124 illustrating a top perspective view of a mounting position assembly apparatus 12 on a rail system 126 with a first rail 128, a second rail 132 for a cutting saw 130 including a flat piece of material 134 to be cut.

FIG. 4 illustrates only a portion of the rail system 126 including two parallel rails attached for the cutting saw 130 (not drawn precisely to scale to clearly illustrate components of the invention). the rail system 126 (also called a track system or a strut system) for a cutting saw 130 ensures that the cutting saw 130 is square (i.e., a ninety-degree angle) to an edge of a material 134 being cut helping to increase the accuracy of cuts. Most rail systems 126 have two parallel guide rails (e.g., 128, 132) connected with perpendicular support pieces 127 (only one of which is illustrated) providing a supported straight track to the cutting saw 130 to move a piece of material 134 being cut. Many rail systems 126 include the two parallel guide rails (e.g., 128, 132) with lengths of three to four feet (about 91.44 meters to about 1.22 meter) in length before the cutting saw 132 and after the cutting saw 130 (not illustrated in FIG. 4) to provide support for the materials 134 before and after a cut. However, the present invention is not limited to such an embodiment and other embodiments can be used to practice the invention.

FIG. 4 illustrates a piece of material 134 comprising a flat board 134 parallel to the pressed against individual material holding component 90" to be held in place while cutting with the cutting saw 130. The mounting position assembly apparatus 12 can also be used to cut materials 134 placed perpendicular to the mounting position assembly apparatus 12. In another embodiment, the materials 134 to be cut are placed on a top surface of two or more individual material holding components 90', 90" (not illustrated in FIG. 4). Such an embodiment allows a material 134 including a very long length to be cut with the cutting saw. However, the present invention is not limited to such an embodiment and other embodiments can be used to practice the invention.

FIG. 4 also illustrates a second direction 135 to place the materials 134 to be cut. The second direction 135 to be cut is perpendicular to the rollers 48, 48' and the rollers are not used. The top surfaces of two the individual material holding components 90, 90" would be used to hold the material 134 to be cut. However, the present invention is not limited to such an embodiment and other embodiments can be used to practice the invention.

FIG. 5 is a block diagram 136 illustrating a top perspective view of a dove-tail shaped component 42, 84.

FIG. 6 is a block diagram 138 illustrating a top perspective view of a hexagon shaped component 104.

The hexagon shape was selected to allow the individual material holding component 90 to hold and engage plural different types of materials 134 to be held in place at plural different angles, including but not limited to a hexagon edge 140, 140', 140" (FIG. 6), where two hexagon sides meet, and/or on an individual side of a hexagon 142 (FIG. 6), with the mounting position assembly apparatus 12 for plural different types of materials with plural different surface angles (e.g., square, rectangle, polygonal, circular, oval, etc.). However, the present invention is not limited to such embodiments and other shapes can be used for the individual material holding components 90.

Figure 7:
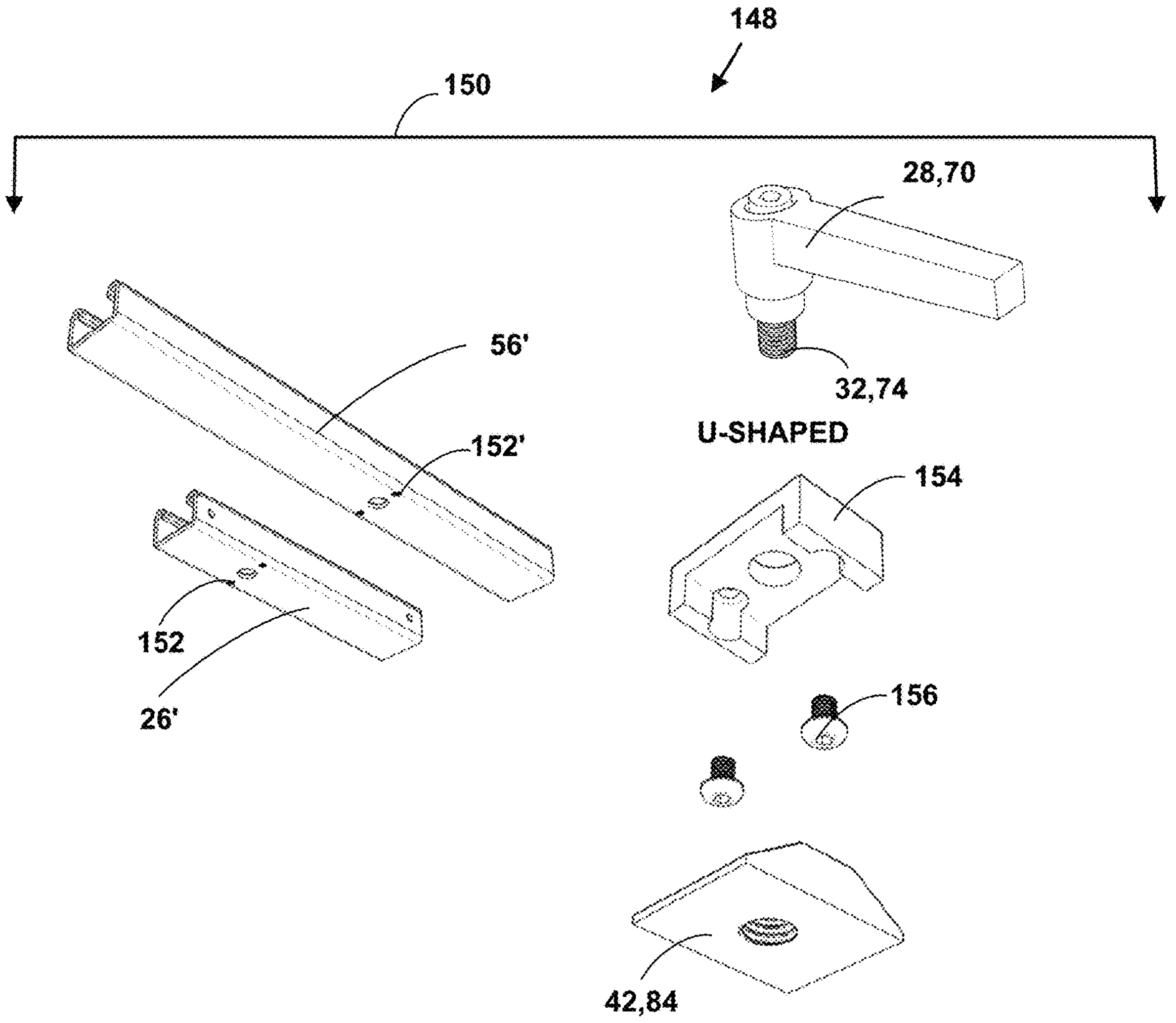
FIG. 7 is a block diagram illustrating a bottom perspective view of another mounting position assembly apparatus.

FIG. 7 is a block diagram illustrating a bottom perspective view 148 of another mounting position assembly apparatus 150.

In FIG. 7, the mounting position assembly apparatus 150 includes another first channel 26' and another second channel 56' with two additional threaded female receptacles 152, a third handle support component 154 for accepting two male connection means 156, 156' illustrated as two threaded bolts in FIG. 7.

In FIG. 5, the first fence rail locking component 34 and the second fence rail locking component 76 are illustrated as an S-shape. In FIG. 7, the third handle support component 154 includes a U-shaped handle support component 154. It has been determined experimentally that the U-shaped handle support component 154 with the two additional threaded female receptacles 152, for accepting two male connection means 156, 156' provides significantly more additional clamping force when the handles 28, 70 are rotated and torque is applied to apply clamping forces since the U-shaped handle support component 154 is attached with the two male connection means 156, 156' to the rail components 26', 56'. However, the present invention is not limited to such embodiments and other handle support components with other shapes can be used to practice the invention.

The mounting position assembly apparatus 12 can be used on the rail system 126 to the left (illustrated in FIG. 4) and/or to the right of the cutting saw 130. In one embodiment, the mounting position assembly apparatus 12 components 28, 70, 90, 90', 90" can be used alone in the rail system 126 without the other components of the mounting position assembly apparatus 12 to provide additional clamping support to clamping of materials 134 in the rail system 126 and keeping the rail system 126 stable for the cutting material 134 with the cutting saw. However, the present invention is not limited to such embodiments and other embodiments can be used to practice the invention.

The mounting position assembly apparatus 12 includes, but not limited to, the second material holding component 100 movable up and down vertically on the first threaded male component 94 of the first material holding component 92 for engaging and holding materials of varying thickness at plural different vertical positions on the first threaded male component 92 and/or for engaging and holding materials of varying thickness in between the first material holding component 92 and the second material holding component 100 (e.g., 144 FIG. 6) and/or between the second material holding component 100 and a third material holding component 104 (e.g., 146, FIG. 6). In one embodiment, two pieces of the material can be hold in place for cutting simultaneously, a first in between the first material holding component 92 and the second material holding component 100 (e.g., 144 FIG. 6) and a second between the second material holding component 100 (e.g., 144 FIG. 6) and/or in between the second material holding component 100 and a third material holding component 104 (e.g., 146, FIG. 6). In such an embodiment, none of the materials to be cut may not be in contact with the plural rollers 48, 48'. In such an embodiment, the materials to be cut will be clamped into place with the edges to be cut extended to a saw blade in the saw 130. However, the present invention is not limited to such embodiments and other material holding mechanisms can be used for the individual material holding components 90.

In one embodiment, the first side surfaces 20 of the first mounting rail 14, second side surfaces 60 of the second mounting rail 56, plural surfaces on the one or more material holding components 92, 100, 104 provide a plural separate individual side holding surfaces 142, 142', 142" (illustrated with a number on one side surface on each component 92, 100, 104) to hold the materials 134 to be cut with the cutting saw 130 provide second safety improvement with the apparatus 12 as the materials 134 to be cut with the cutting saw 130 are held securely for cutting if the materials 134 are large in size and/or very small in size. However, the present invention is not limited to such an embodiment and other embodiments may be used to practice the invention.

In one embodiment, two or more of the mounting position assembly apparatus 12 are added to the rail system 126 for the cutting saw 130 in two or more different locations on the rail system 126 for the cutting saw 130 to securely hold the materials 134 as the materials 134 are moved toward the cutting saw 130. However, the present invention is not limited to such an embodiment and other embodiments may be used to practice the invention with more or less than two or more the mounting position assembly apparatus 12.

The mounting position assembly apparatus for cutting tools 12 is dynamically attachable to, and removable from, the rail system 126 for the cutting saw 130 plural different positions on the rail system 126 for the cutting saw 130. The apparatus 12 provides great flexibility for holding and clamping material 134 that are being cut with the cutting saw 130 for safely cutting the materials 134 of varying thicknesses.

In one embodiment the mounting position assembly apparatus for cutting tools 12 is dynamically moved to plural different positions by sliding it back and forth horizontally within the individual rails 128, 132 of the rail system 126. In another embodiment, the mounting position assembly apparatus for cutting tools 12 is dynamically moved by picking it up and moving it to a new position on the rail system 126.

In all of figures, the first male handle component 30 is illustrated turned inward to the materials 134 for illustrative purposes only. When the invention is in use, the first male handle component 30 turned outward so the first male handle component 30 will not interfere with the materials 134 being cut.

Figure 8:
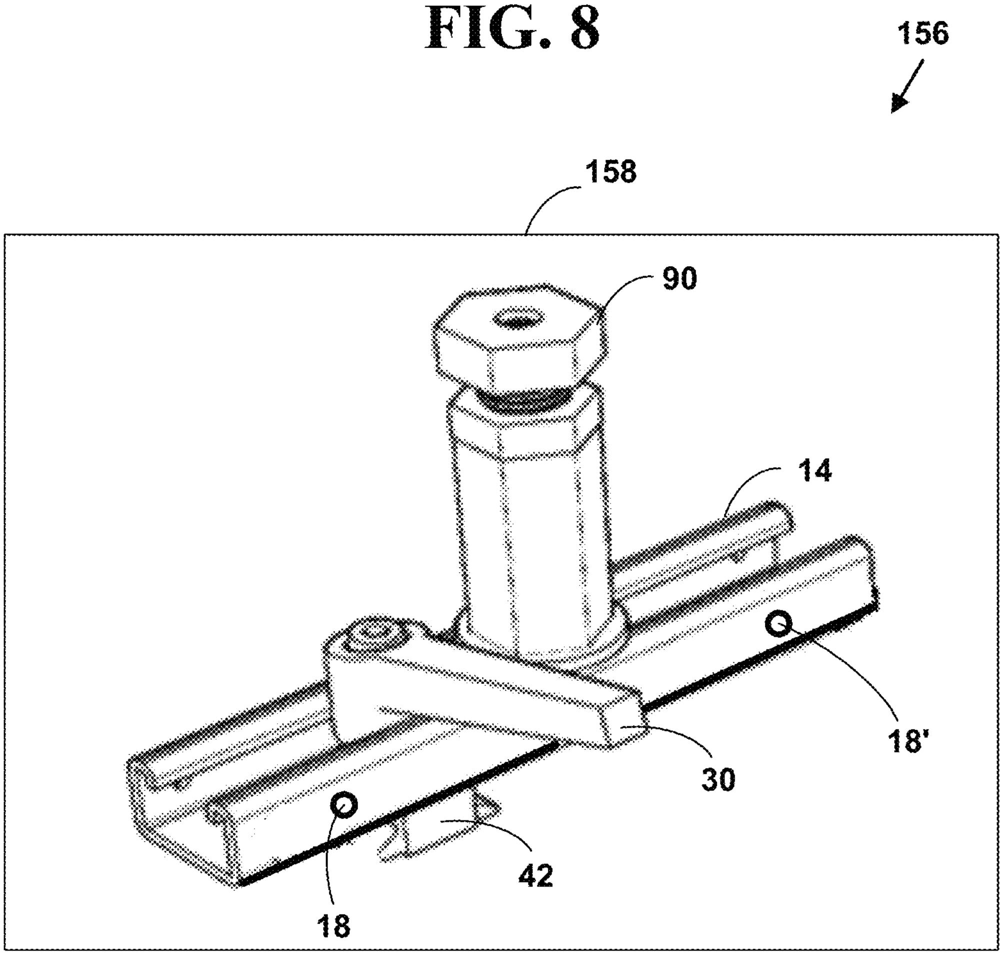
FIG. 8 is a block diagram illustrating a top perspective view of a mounting position assembly apparatus including only a first mounting rail.

FIG. 8 is a block diagram 156 illustrating a top perspective view of a mounting position assembly apparatus 158 including only a single rail, first mounting rail 14.

Figure 9:
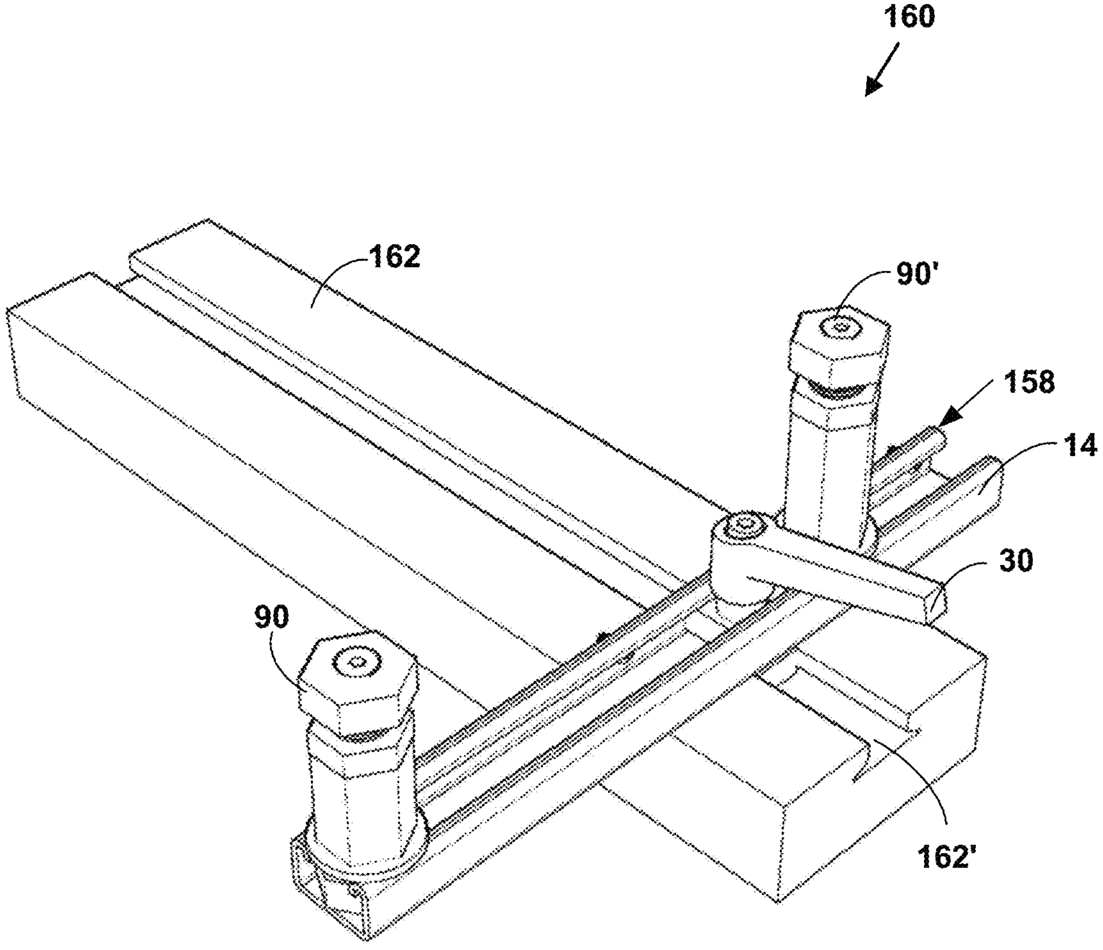
FIG. 9 is a block diagram illustrating a top perspective view of a mounting position assembly apparatus used on a single rail system.

In such an embodiment, the single rail apparatus 158 includes the only the first mounting rail 14 with the first pre-determined length 16, one or more first handle components 30 (only one illustrated in FIG. 8). and one or more individual material holding components 90 (only one illustrated in FIG. 8) to be used in a single rail 128, 132 of the rail (track/struct) system 126 (FIG. 4) and/or in a single rail sail system 162 (FIG. 9). However, the present invention is not limited to such embodiments and other embodiments can be used to practice the invention.

FIG. 9 is a block diagram 160 illustrating a top perspective view of a mounting position assembly apparatus 158 used on a single rail system 162.

In FIG. 9, the single rail system 162 includes a single rail 162' including, but not limited to, a T-shaped channel and/or a dove-tail shaped channel. The mounting position assembly apparatus 158 is pivoted 90 degrees from the orientation of the single rail system 162 and the double rail system 126 illustrated in FIG. 4. In this orientation, the rollers 48, 48' are not used and the materials 134 to be cut are placed on a top surface of two or more individual material holding components 90', 90" for cutting by the cutting saw 130. Only a portion of the single rail system 158 is illustrated in FIG. 9 for simplicity.

Figure 10:
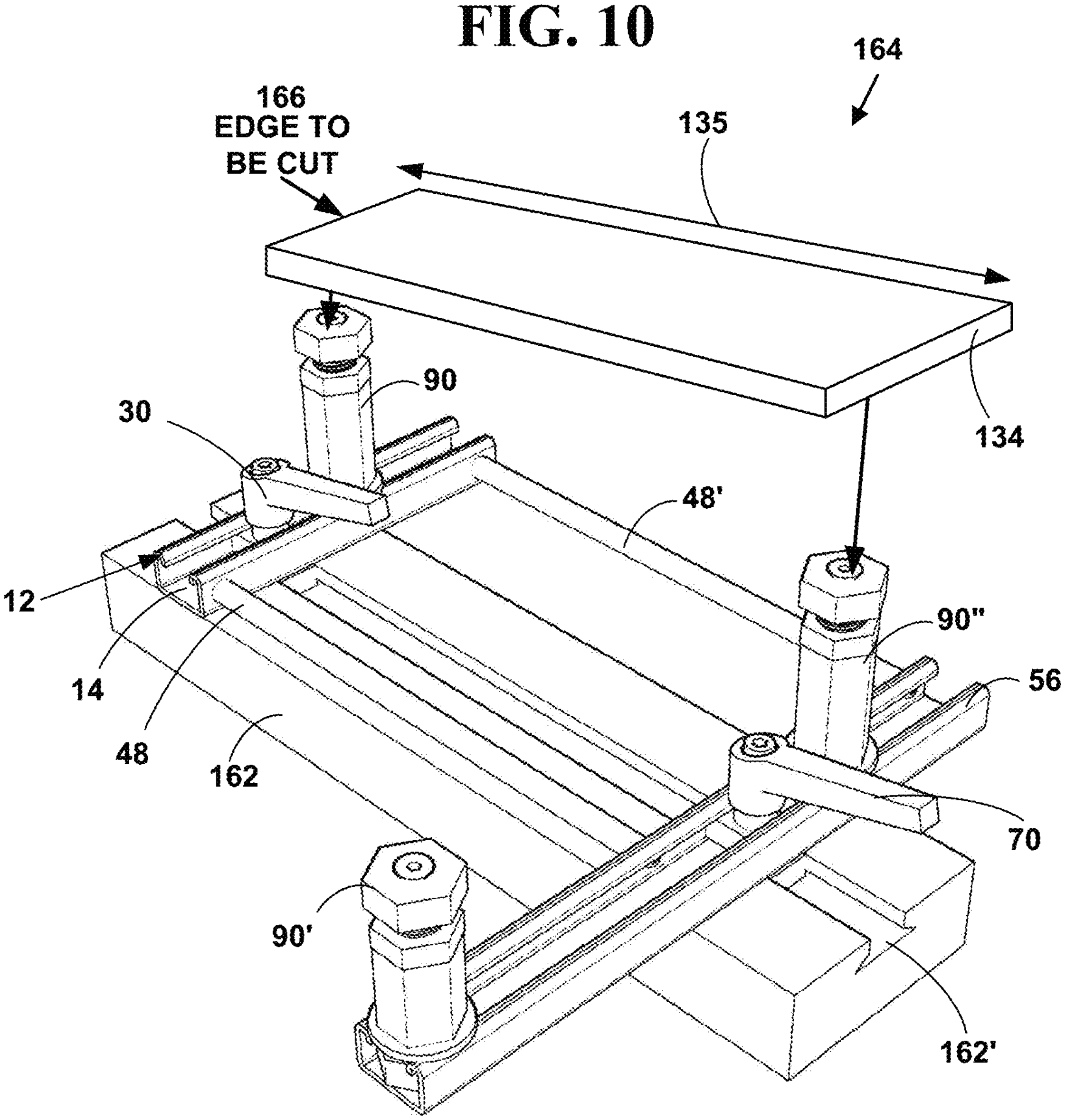
FIG. 10 is a block diagram illustrating a top perspective view of a mounting position assembly apparatus used on a single rail system.

FIG. 10 is a block diagram 164 illustrating a top perspective view of a mounting position assembly apparatus 156 used on a single rail system 162.

FIG. 10 illustrates a material 134 to be cut (e.g., a wood board, etc.) placed a top surface of two or more individual material holding components 90', 90" in a cutting direction 135 which is parallel to the single rail system 162. Only a portion of the single rail system 162 is illustrated for simplicity in FIG. 10. FIG. 10 also illustrates an edge 166 of the material 134 (e.g., a wood board, etc.) to be cut by the cutting saw 130 (not illustrated in FIG. 10).

Figure 11:
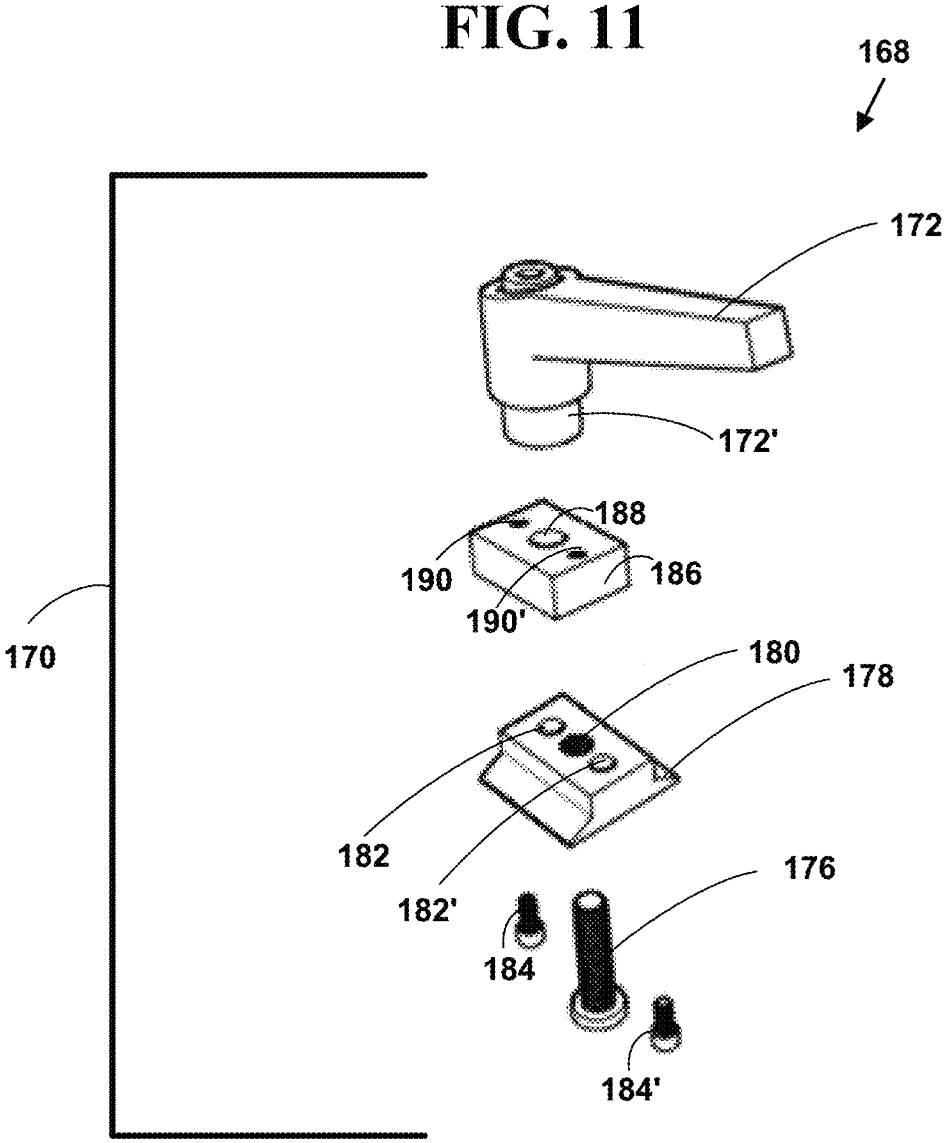
FIG. 11 is a block diagram illustrating an exploded view of another illustrating an exploded view of a female fence rail locking component for a mounting position assembly apparatus.

FIG. 11 is a block diagram 168 illustrating an exploded view of another illustrating an exploded view of another fence rail locking component 170 for a mounting position assembly apparatus 12, 156.

FIG. 11 illustrates a female fence rail locking component 170 comprising a female handle component 172, a threaded female component 172' within the female handle component 172 for engaging a first threaded male connection means 176 (e.g., a threaded bolt, pin, rivet, screw, etc.). The first male connection means 176 extending upwards though a trapezoidal handle connection component 178. The trapezoidal handle connection component 178 including a trapezoidal shape. The trapezoidal handle connection component 178 including a threaded female central receptacle 180 extending through the trapezoidal handle connection component 178 for engaging the first threaded male connection means 176 and including two or more female receptacles 182, 182' extending through the trapezoidal handle connection component 178 for accepting two or more second male connection means 184, 184'. The trapezoidal handle connection component 178 engaging a bottom surface of a trapezoidal handle connection component 178. The trapezoidal handle connection component engaging a selected rail 14, 56, 162' in the rail system 128. 162, for the cutting saw 130. The block support component 186 including a central female receptacle 188 extending through the block support component 186 for engaging the first threaded male connection means 176 and including two or more threaded female receptacles 190, 190' extending through the block support component 186 for accepting the two or more second male connection means 184, 184' The block support component 186 engaging a top surface of the trapezoidal handle connection component 178. The female handle component 170 rotatable in a clockwise and counterclockwise direction for tightening and loosening the female fence rail locking component 170 at another desired position in the rail system 128, 162 for the cutting saw 130.

The female fence rail locking component 170 is used in the mounting position assembly apparatus 12, 156 in both a double rail system 128 and a single rail system 162 for the cutting saw. In one embodiment, only female fence rail locking components 170 are used to practice the invention. In another embodiment, only male fence rail locking components 28, 70 are used to practice the invention. In another embodiment, various combinations of the female fence rail locking component 170 and the male fence rail locking components 28, 70 are used to practice the invention. However, the present invention is not limited to these embodiments and other embodiments can be used to practice the invention.

It has been determined experimentally that the additional block support component 186 within the female fence rail locking component 170 provides an optimum level of clamping force in a rail system 126, 162, manufactured from aluminum (or other soft metals, plastics and/or other materials) that may warp and/or otherwise be deformed (e.g., with use in hot and/or cold temperatures) and/or wear out, during repeated use. Such warping, deformation and wear prevent other types of cutting protection guides that do not include the claimed invention, from being securely clamped with the rail system 126, 162. The additional block support component 186 within the female fence rail locking component 170 provides an optimum level of protection from slipping and torque forces (i.e., forces that can cause an object to rotate about an axis, etc.) when the female handle component 172 of female fence rail locking component 170 is rotated. However, the present invention is not limited to such embodiments and more, fewer and/or other types of components can be used to practice the invention.

The present invention is described with threaded receptacles and/or receptacles with no threads. In other embodiments, the threaded receptacles can be replaced with receptacles with no threads and/or visa-versa. Threaded connection means can be replaced in some circumstances with connection means with no threads and the invention is not limited to the use of components with threads and/or use of components without threads and can be practiced with many different combinations of components. However, the present invention is not limited to such embodiments and more, fewer and/or combinations of components can be used to practice the invention.

Figure 12:
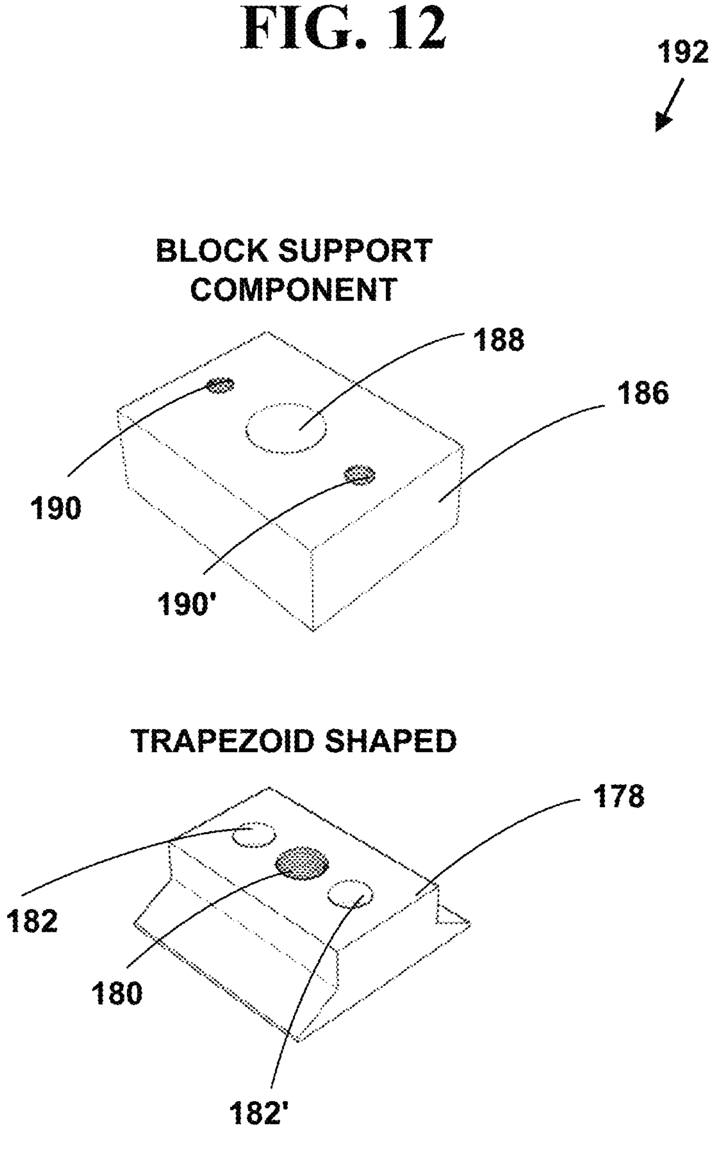
FIG. 12 is a block diagram illustrating additional details of the female fence rail locking component for the mounting position assembly apparatus.

FIG. 12 is a block diagram 192 illustrating additional details of the female fence rail locking component 170 for the mounting position assembly apparatus 126, 162.

FIG. 12 illustrates additional details of the trapezoidal handle connection component 178 and the block support component 186.

Figure 13:
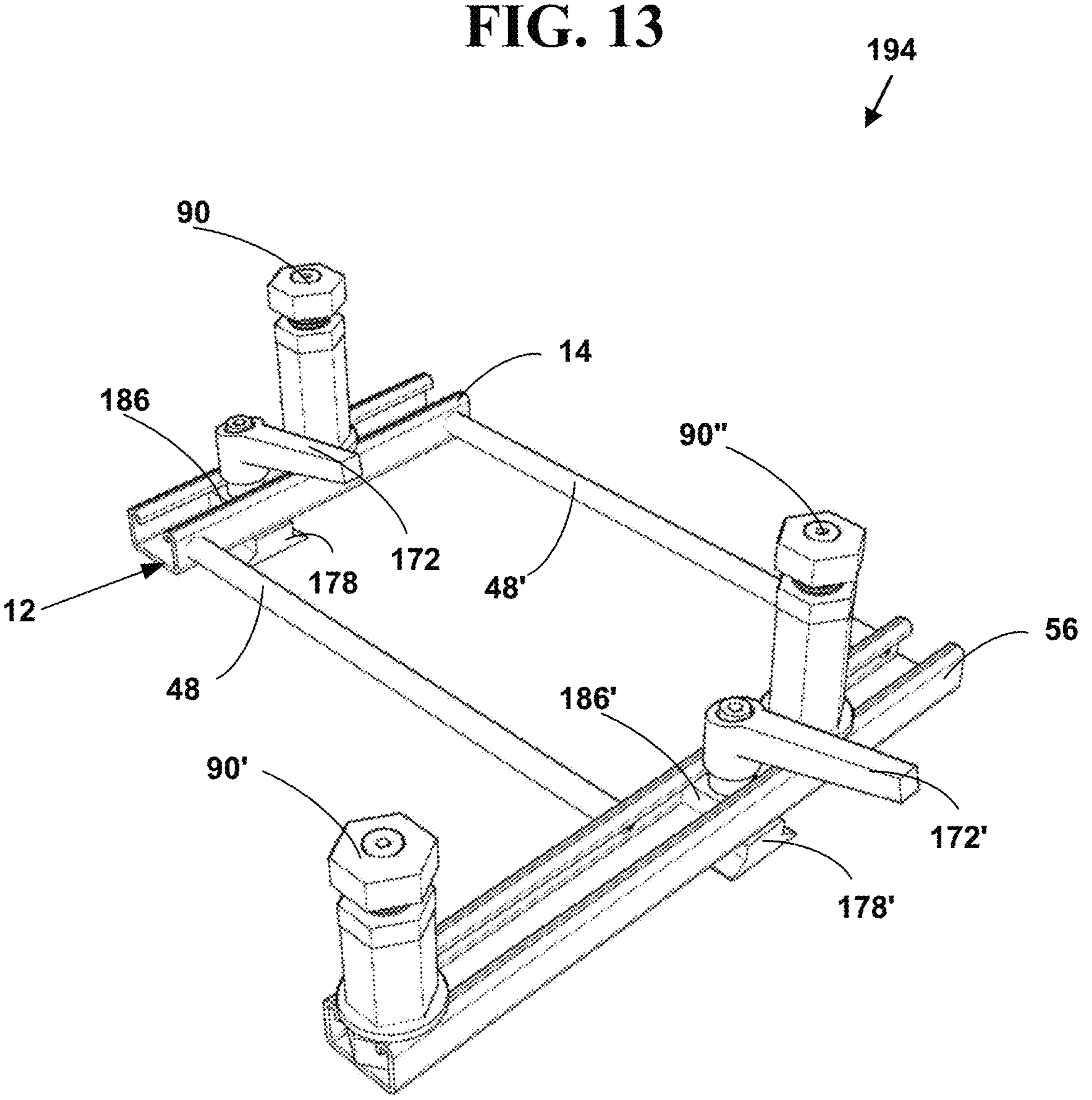
FIG. 13 is a block diagram illustrating a top perspective view of a mounting position assembly apparatus with the female fence rail locking component.

FIG. 13 is a block diagram 194 illustrating a top perspective view of a mounting position assembly apparatus 12 with two female fence rail locking components 170.

FIG. 13 illustrates two female fence rail locking components 170 with two female handle components 172, 172' trapezoidal handle connection component 178, 178 and trapezoidal handle connection component 178, 178' visible.

FIG. 13 illustrates two female fence rail locking components 170. However, the present invention is not limited to such an embodiment and various combinations of male fence rail locking components 28, 70 and female fence rail locking components 170 can be used to practice the invention including all female, all male and/or various combinations of male fence rail locking component 28, 70 and female fence rail locking components 170.

Figure 14:
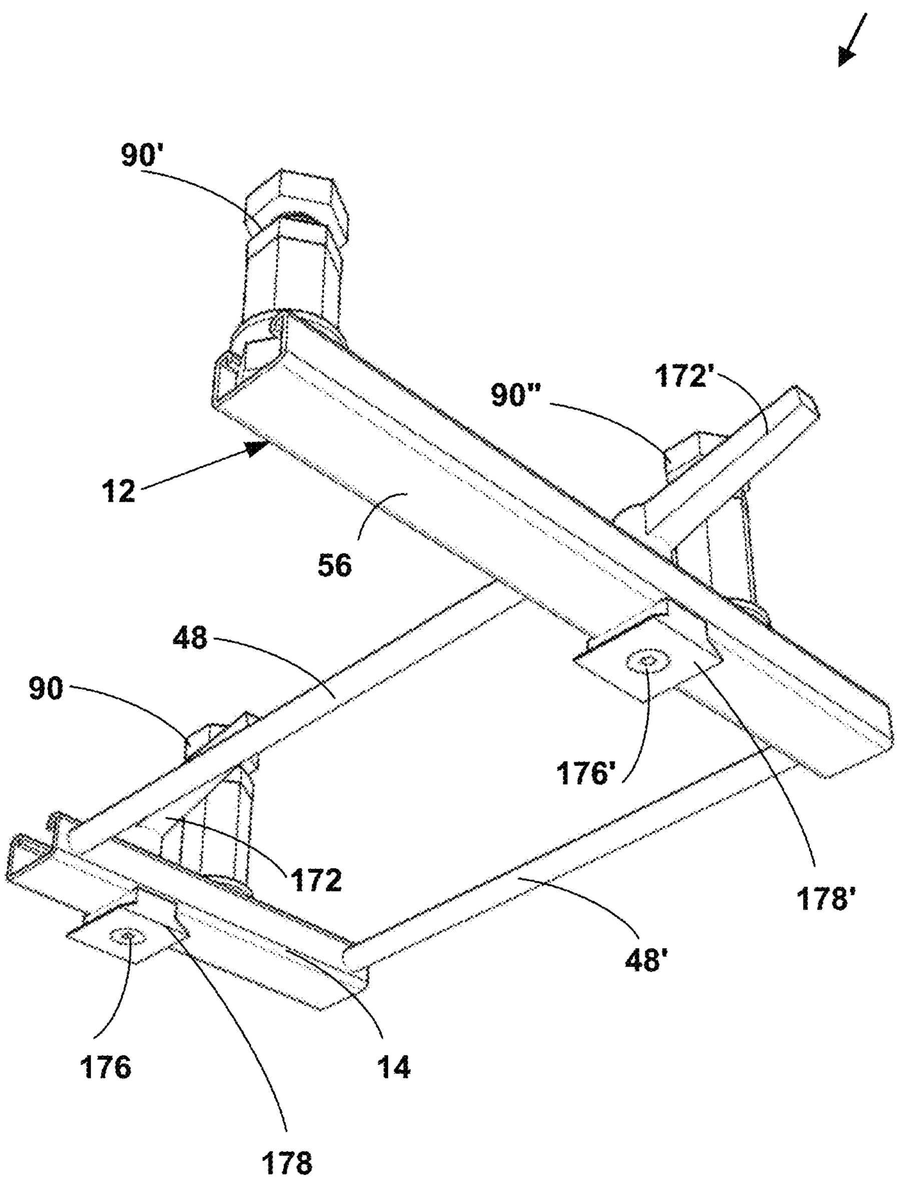
FIG. 14 is a block diagram illustrating a bottom perspective view of a mounting position assembly apparatus with the female fence rail locking component.

FIG. 14 is a block diagram 196 illustrating a bottom perspective view of a mounting position assembly apparatus 12 with the female fence rail locking components 170.

FIG. 14 illustrates two female fence rail locking components 170 with two female handle components 172, 172', trapezoidal handle connection component 178, 178', trapezoidal handle connection component 178, 178' and first threaded male connection means 176, 176' visible.

FIG. 14 illustrates two female fence rail locking components 170. However, the present invention is not limited to such an embodiment and various combinations of male fence rail locking components 28, 70 and female fence rail locking components 170 can be used to practice the invention including all female, all male and/or various combinations of male fence rail locking component 28, 70 and female fence rail locking components 170.

FIGS. 13 and 14 illustrate the placement of the trapezoidal handle connection component 178, 178' within the first rail 14 and second rail 56 of the mounting position assembly apparatus 12 and the trapezoidal handle connection components 178, 178' underneath the first rail 14 and second rail 56 of the mounting position assembly apparatus 12 for placement into the two rails 128, 132 of the rail system 126 for the cutting saw 130.

The figures illustrate only one male fence rail locking component 28, 70 and/or one female fence rail locking component 170 in each rail 14, 56 and the position assembly apparatus 158 including only a single rail. However, the present invention is not limited to such an embodiment and more than one male fence rail locking component 28, 70 and/or female fence rail locking components 170 and various combinations thereof, can be placed in each rail 28, 70, 28', 70' and used to practice the invention.

FIGS. 1 and 7 illustrate two male connection means 156, 156'. The invention can be practiced with one male connection means 156 and/or more than two connection means 156 156'. FIGS. 1 and 11 illustrate two or more second male connection means 184, 184'. However, the invention can be practiced with one second male connection means 184, 184' and/or more than two more second male connection means 184, 184'. If one connection means is used, then one of the female receptacles in the U-Shaped handle support component 154 can be eliminated and one of the female receptacles in the first rail 26' and second rail 56' can be eliminated (FIG. 7) and/or one of the two or more female receptacles 182, 182' on the trapezoidal handle connection 178 and one of the two female receptacles 190, 190' on the block support component 186 can be eliminated to practice the invention. If more than two male connection means are used than additional female receptacles would be required to practice the invention. However, the present invention is not limited to such embodiments and other embodiments can be used to practice the invention.

Individual components of the mounting position assembly apparatus for cutting tools 12 comprise: metal components including iron, steel, stainless steel or aluminum metal components, rubber, wood, plastic or composite materials components or combinations thereof. However, the present invention is not limited to such embodiments and other embodiments with other materials can be used to practice the invention.

Various component of the mounting position assembly apparatus for cutting tools 12 are individually manufactured, machined, 3D printed by a 3D printer, extruded and/or pultruded including metal, rubber, wood, plastic and/or composite materials and/or combinations thereof.

However, the present invention is not limited to such embodiments and other embodiments with other ways to create the mounting position assembly apparatus for cutting tools 12 can be used to practice the invention.

“Manufacturing” includes the process of making items from raw materials. “Machining” includes various processes in which a piece of raw material is cut into a desired final shape and size by a controlled material-removal process.

A “3D printer” includes 3D printing or “Additive manufacturing.” 3D printing is a process of making a three-dimensional solid object of virtually any shape from a digital model. 3D printing is achieved using an “additive process,” where successive layers of material (e.g., metal, plastic, etc.) are laid down in different shapes. 3D printing is also considered distinct from traditional manufacturing and/or machining techniques, which mostly rely on the removal of material by methods such as cutting or drilling and are “subtractive” processes.

“Extrusion” is a manufacturing process where a material such as aluminum, etc. is pushed and/or drawn through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

The feedstock may be forced through the die by various methods: by an auger, which can be single or twin screw, powered by an electric motor: by a ram, driven by hydraulic pressure, oil pressure or in other specialized processes such as rollers inside a perforated drum for the production of many simultaneous streams of material. “Pultruson” is a manufacturing process for producing continuous lengths of materials. Pultruson raw materials include metals such as aluminum, etc. or a liquid resin mixture (e.g., containing resin, fillers and specialized additives) and reinforcing fibers (e.g., fiberglass, composite materials, etc.). The process involves pulling these raw materials (rather than pushing as is the case in extrusion) through a heated steel forming die using a continuous pulling device. The reinforcement materials are in continuous forms such as rolls of fiberglass mat or doffs of fiberglass roving. As the reinforcements are saturated with the resin mixture in the resin impregnator and pulled through the die, the gelation (or hardening) of the resin is initiated by the heat from the die and a rigid, cured profile is formed that corresponds to the shape of the die.

There are also protruded laminates. Most pultruded laminates are formed using rovings aligned down the major axis of the part. Various continuous strand mats, fabrics (e.g., braided, woven and knitted), and texturized or bulked rovings are used to obtain strength in the cross axis or transverse direction.

The pultrusion process is normally continuous and highly automated. Reinforcement materials, such as roving, mat or fabrics, are positioned in a specific location using preforming shapers or guides to form a pultrusion. The reinforcements are drawn through a resin bath where the material is thoroughly coated or impregnated with a liquid thermosetting resin. The resin-saturated reinforcements enter a heated metal pultruson die. The dimensions and shape of the die define the finished part being fabricated. Inside the metal die, heat is transferred initiated by precise temperature control to the reinforcements and liquid resin. The heat energy activates the curing or polymerization of the thermoset resin changing it from a liquid to a solid. The solid laminate emerges from the pultruson die to the exact shape of the die cavity. The laminate solidifies when cooled and it is continuously pulled through the pultruson machine and cut to the desired length. The process is driven by a system of caterpillar or tandem pullers located between the die exit and the cut-off mechanism.

A “composite material” is a combination of two materials with different physical and chemical properties. The different physical or chemical properties of the two materials remain separate and distinct at the macroscopic or microscopic scale within the finished structure. Common polymer-based composite materials, include at least two parts, a substrate (e.g., fibers, etc.) and a resin.

When they are combined, they create a material which is specialized material to do a certain job, for instance to become stronger, lighter or resistant to electricity. Composite materials also improve strength and stiffness of the materials. One reason for their use over traditional materials is because they improve the properties of their base materials and are applicable in many situations.

The composite materials include, but are not limited to, “Fiber-reinforced polymers” (FRP) including thermoplastic composites, short fiber thermoplastics, long fiber thermoplastics or long fiber-reinforced thermoplastics. There are numerous thermoset composites, but advanced systems usually incorporate aramid fiber and carbon fiber in an epoxy resin matrix. The composite materials also include carbon/carbon composite materials with carbon fibers and a silicon carbide matrix.

A mounting position assembly apparatus for cutting tools is presented herein. The apparatus includes two mounting rails connected by plural rollers that are insertable into and removable from a rail system for a cutting saw. The apparatus includes two locking components to lock the two mounting rails securely into the rail system at plural different locations. The apparatus includes one or more material holding components dynamically attachable to and removable from to the first mounting rail and the second mounting rail. The one or more material holding components movable up and down vertically on a vertical threaded component for engaging and holding materials of varying thickness at plural different vertical positions on plural different surfaces for safely cutting with the cutting saw.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term “means” in any claim is intended to invoke 35 U.S.C. § 112, paragraph 6, and any claim without the word “means” is not so intended. Therefore, all embodiments that come within the scope and spirit of the following claims and equivalents thereto are claimed as the invention.

I claim:

1. A mounting position assembly apparatus for cutting tools, comprising in combination:

a first mounting rail with a first pre-determined length, including:

a plurality of first side receptacles for accepting a plurality of first side connection components in one or more first side surfaces of the first mounting rail, one or more first threaded bottom connection receptacles for accepting one or more first bottom connection components in a first bottom surface of the first mounting rail to connect the first mounting rail to a first fence rail in a rail system for a cutting saw, the first mounting rail including a first channel with a first pre-determined shape;

the first mounting rail inserted in the first fence rail in the rail system for the cutting saw, the first fence rail in the rail system for the cutting saw including the cutting saw;

the first mount rail including the first pre-determined length shorter than a second mounting rail with a second pre-determined length;

the first pre-determined length shorter than the second mounting rail with the second pre-determined length allowing a cutting saw blade in the cutting saw to rotated left and rotated right a full forty-five degrees and not interfere with other components of the mounting position assembly apparatus;

a first fence rail locking component including:

a first male handle component with a threaded male component for engaging a first bottom connection receptacle in the bottom surface in the first mounting rail component, a first handle support component including a central receptacle extending through the first handle support component for engaging the threaded male component of the first handle component, the first handle support component including:

a first support component extending upwards from a first end surface of the first handle support component to engage and provide support on a side surface of the first mounting rail, and a second support component extending downward from a second end surface of the first handle support component to engage and provide support on a side surface of a first handle connection component, the first handle connection component, including:

a threaded female central receptacle for accepting the threaded male component of the first male handle component and securely tightening and holding the first fence rail locking component and first mounting rail at a first desired position in the first fence rail in the rail system for the cutting saw;

the first male handle component rotatable in a clockwise and counterclockwise direction for tightening and loosening the first fence rail locking component allowing movement of the first fence rail locking component to a plurality of different positions in the first fence rail in the rail system for the cutting saw; and the first handle connection component including a dovetail shape or a trapezoidal shape for securely engaging top and side surfaces of the first rail in the rail system for the cutting saw allowing the first handle connection component to be tightened securely to prevent slipping in the first rail in the rail system for the cutting saw, wherein the first rail in the rail system for the cutting saw includes a t-shape rail or a dove tail shaped rail;

a plurality of rollers, attachable to and removable from to the first mounting rail and the second mounting rail, including:

threaded female receptacles in ends of the plurality of rollers for attaching the plurality of rollers to the first mounting rail at one end and to a second mounting rail with a second pre-determined length at a second end, a plurality of roller connection components including threaded male components for engaging the threaded female receptacles in ends of the plurality of rollers through the one or more first side connection components in the one or more first side surfaces of the first mounting rail, and through one or more second side connection components in one or more second side surfaces of the second mounting rail, and the plurality of rollers allowing materials to be cut with the cutting saw to be easily rolled along the rail system for the cutting saw with the mounting position assembly apparatus;

the second mounting rail with the second pre-determined length, including:

a plurality of second side receptacles for accepting a plurality of second side connection components in one or more second side surfaces of the second mounting rail, one or more second threaded bottom connection receptacles for accepting one or more second bottom connection components in a second bottom surface of the second mounting rail to connect the second mounting rail to a second fence rail in a rail system for a cutting saw, the second mounting rail including a second channel with a second pre-determined shape;

a second fence rail locking component including:

a second male handle component with a second threaded male component for engaging a second bottom connection receptacle in the bottom surface in the second mounting rail component, a second handle support component including a second central receptacle extending through the second handle support component for engaging the second threaded male component of the second male handle component, the second handle support component including:

a first support component extending upwards from a first end surface of the second handle support component to engage and provide support on a side surface of the second mounting rail, and a second support component extending downward from a second end surface of the second handle support component to engage and provide support on a side surface of a second handle connection component, the second handle connection component including:

a second threaded female central receptacle for accepting the second threaded male component of the second male handle component and securely tightening and holding the second fence rail locking component and second mounting rail at a second desired position in the second fence rail in the rail system for the cutting saw;

the second male handle component rotatable in a clockwise and counterclockwise direction for tightening and loosening the second fence rail locking component allowing movement of the second fence rail locking component to a plurality of different positions in the second fence rail in the rail system for the cutting saw;

the second handle connection component including the dove-tail shape or the trapezoidal shape for securely engaging top and side surfaces of the second rail in the rail system for the cutting saw allowing the second handle connection component to be tightened securely to prevent slipping in the second rail in the rail system for the cutting saw, wherein the second rail in the rail system for the cutting saw includes a t-shape rail or a dove tail shaped rail;

one or more material holding components, an individual material holding component including:

a hexagon shape;

a first material holding component s with a first threaded male component for engaging a second material holding component with a second threaded female receptacle;

the second material holding component movable up and down on the first threaded male component of the first material holding component for engaging and holding materials of varying thickness at a plurality of different vertical positions on the first threaded male component;

a third material holding component second with a top third threaded female receptacle in a top surface of the third material holding component for engaging the first threaded male component of the first material holding component for engaging and holding the materials of varying thickness and a bottom third threaded female receptacle in a bottom surface of the third material holding component for engaging a second threaded male component from a fourth material holding component;

the third material holding component movable up and down on the first threaded male component of the first material holding component for engaging and holding the materials of varying thickness at a plurality of different vertical positions on the first threaded male component;

a material holding support component with a central receptacle extending through the material holding support component for engaging the second threaded male component from the fourth material holding component, the material holding support component including a diameter wider than a first width of the first mounting rail and a second width the second mounting rail providing support for the individual material holding component on a first top surface on the first mounting rail and a second top surface on the second mounting rail; and a fourth material holding component, including the second threaded male component for engaging the bottom third threaded female receptacle in the bottom surface of the third material holding component, the second threaded male component extending from a bottom portion of the fourth material component, the fourth material component including the bottom portion of the fourth material component for attaching the individual material holding component within the first channel of the first mounting rail including or within the second channel of the second mounting rail at a plurality of different positions within the first mounting rail or within the second mounting rail.

2. The mounting position assembly apparatus for cutting tools of claim 1, including:

the first mounting rail with the first pre-determined length with the first pre-determined shape including the first locking component to lock the first mounting rail in the first rail of the rail system for the cutting saw;

the second mounting rail with the second pre-determined length with the second pre-determined shape including the second locking component to lock the second mounting rail in the second rail of the rail system for the cutting saw;

the first mounting rail connected to the second mounting rail with the plurality of rollers for rolling the materials towards to be cut towards the cutting saw; and the one or more material holding components dynamically attachable to and removable from to the first mounting rail and the second mounting rail, the one or more material holding components movable up and down vertically on a vertical threaded component for engaging and holding the materials of varying thickness at a plurality of different vertical positions for cutting with the cutting saw, and the one or more material holding components including a plurality of individual material holding components movable up and down vertically on the vertical threaded component to create one more vertical distances in between selected ones of the plurality of individual material holding components for engaging and holding the materials of varying thicknesses at a plurality of different vertical positions in between the plurality of individual material holding components within the one or more crated vertical distances of the selected ones of the plurality of individual material holding components for cutting with the cutting saw, the mounting position assembly apparatus for cutting tools dynamically attachable to, and removable from, the rail system for the cutting saw at a plurality of different positions on the rail system for the cutting saw for safely cutting the materials of varying thicknesses.

3. The mounting position assembly apparatus for cutting tools of claim 1 wherein, the mounting position assembly apparatus is adjusted vertically up and down to allow the materials to be cut with different models of cutting saws that have blades at different heights above the rail system.

4. The mounting position assembly apparatus for cutting tools of claim 1 wherein, two or more of the mounting position assembly apparatus are added to the rail system for the cutting saw in two or more different locations on the rail system for the cutting saw to securely hold the materials as the materials are moved toward the cutting saw.

5. The mounting position assembly apparatus for cutting tools of claim 1 wherein, the first mounting rail and the second mounting rail include a T-shaped channel or a dove-tail shaped channel.

6. The mounting position assembly apparatus for cutting tools of claim 1 wherein, disconnecting the first mounting rail from the second mounting rail by removing the plurality of rollers connecting the first mounting rail and the second mounting rail; and installing the first mounting rail including all the first mounting rail components into a single rail in a single rail system including a cutting saw.

7. The mounting position assembly apparatus for cutting tools of claim 1 wherein, individual components of the mounting position assembly apparatus for cutting tools comprise: metal components including iron, steel, stainless steel or aluminum metal components, rubber, wood, plastic or composite materials components or combinations thereof.

8. The mounting position assembly apparatus for cutting tools of claim 1 wherein, components of the mounting position assembly apparatus for cutting tools comprise are individually manufactured, machined, 3D printed by a 3D printer, extruded or pultruded including metal, rubber, wood, plastic or composite materials, or combinations thereof.

9. The mounting position assembly apparatus for cutting tools of claim 1 wherein, the first pre-determined shape for the first channel and the second pre-determined shape for second channel includes a T-shaped channel or a dove-tail shaped channel.

10. The mounting position assembly apparatus for cutting tools of claim 1 wherein, the first handle support component and the second handle support component include an S-shaped component or a U-shaped component.

11. The mounting position assembly apparatus for cutting tools of claim 1 wherein, the first pre-determined shape for the first channel and the second pre-determined shape for second channel includes a different shape.

12. The mounting position assembly apparatus for cutting tools of claim 1 wherein, the first mounting rail with the first pre-determined length includes a shorter length than the second pre-determined length of the second mounting rail or the first mounting rail with the first pre-determined length includes a longer length than the second pre-determined length of the second mounting rail.

13. The mounting position assembly apparatus for cutting tools of claim 1 wherein, the first mounting rail with the first pre-determined length includes a length identical to the second pre-determined length of the second mounting rail.

14. The mounting position assembly apparatus for cutting tools of claim 1 wherein, one or components of the one or more material holding components include the hexagon shape configured for engaging and holding the one or more materials including molding and crown molding.

15. The mounting position assembly apparatus for cutting tools of claim 1 wherein, the one or more material holding components include the hexagon shape are dynamically rotatable and adjustable to a plurality of different angles, to hold materials to be cut with the cutting saw including a plurality of different shapes with a plurality of different surface angles.

16. The mounting position assembly apparatus for cutting tools of claim 1 wherein, the one or more material holding components including the hexagon shape hold a material to be cut at a hexagon edge where two hexagon sides meet or an individual side surface of the hexagon for the one or more material holding components.

17. The mounting position assembly apparatus for cutting tools of claim 1, wherein, the second material holding component is movable up and down vertically on the first threaded male component of the first material holding component for engaging and holding materials of varying thickness at a plurality of different vertical positions on the first threaded male component and for engaging and holding materials of varying thickness in between the first material holding component and the second material holding component and in between the second material holding component and the third material holding component of the individual material holding component from the one or more material holding components.

18. The mounting position assembly apparatus for cutting tools of claim 17, wherein neither a first material held in between the first material holding component and the second material holding component and a second material held in between the second material holding component and the third material holding component of the individual material holding component from the one or more material holding components is in contact with any of the plurality of rollers on the mounting position assembly apparatus for cutting tools.

19. The mounting position assembly apparatus for cutting tools of claim 1, including one individual material holding component on the first mounting rail and two individual material holding components on the second mounting rail.

20. The mounting position assembly apparatus for cutting tools of claim 1, wherein first side surfaces of the first mounting rail, second side surfaces of the second mounting rail, a plurality of surfaces on the one or more material holding components provide a plurality of separate individual side holding surfaces to hold the materials to be cut with the cutting saw.

21. The mounting position assembly apparatus for cutting tools of claim 1, further including a female fence rail locking component, comprising:

a female handle component;

a threaded female component within the female handle component for engaging a first threaded male connection means;

the first male connection means extending upwards though a trapezoidal handle connection component;

the trapezoidal handle connection component including the trapezoidal shape, the trapezoidal handle connection component including a threaded female central receptacle extending through the trapezoidal handle connection component for engaging the first threaded male connection means and including two or more female receptacles extending through the trapezoidal handle connection component for accepting two or more second male connection means, the trapezoidal handle connection component engaging a bottom surface of a block support connection component, the trapezoidal handle connection component engaging a selected rail in the rail system for the cutting saw;

the block support component including a central female receptacle extending through the block support component for engaging the first threaded male connection means and including two or more threaded female receptacles extending through the block support component, for accepting the two or more second male connection means, the block support component engaging a top surface of the trapezoidal handle connection component;

the female handle component rotatable in a clockwise and counterclockwise direction for tightening and loosening the female fence rail locking component at another desired position in the rail system for the cutting saw.

* * * * *